(12) United States Patent
Holst

(10) Patent No.: US 10,008,124 B1
(45) Date of Patent: Jun. 26, 2018

(54) METHOD AND SYSTEM FOR PROVIDING SECURE REMOTE TESTING

(71) Applicant: Beth Holst, Springfield, VA (US)

(72) Inventor: Beth Holst, Springfield, VA (US)

(*) Notice: Subject to any disclaimer, the term of this patent is extended or adjusted under 35 U.S.C. 154(b) by 439 days.

(21) Appl. No.: 14/489,558

(22) Filed: Sep. 18, 2014

Related U.S. Application Data

(60) Provisional application No. 61/879,257, filed on Sep. 18, 2013.

(51) Int. Cl.
  *G09B 5/00* (2006.01)
  *G09B 7/00* (2006.01)
  *G09B 5/02* (2006.01)

(52) U.S. Cl.
  CPC .................................... *G09B 5/02* (2013.01)

(58) Field of Classification Search
  CPC .................................. G09B 5/00; G09B 7/00
  See application file for complete search history.

(56) References Cited

U.S. PATENT DOCUMENTS

| | | | |
|---|---|---|---|
| 4,145,122 A | 3/1979 | Rinard et al. | |
| 4,659,197 A * | 4/1987 | Weinblatt | A61B 3/113 351/158 |
| 4,687,310 A | 8/1987 | Cuvillier | |
| 5,915,973 A | 6/1999 | Hoehn-Saric et al. | |
| 6,130,783 A | 10/2000 | Yagi et al. | |
| 6,333,826 B1 | 12/2001 | Charles | |
| 6,392,687 B1 | 5/2002 | Driscoll, Jr. et al. | |
| 6,424,377 B1 | 7/2002 | Driscoll, Jr. et al. | |
| 6,449,103 B1 | 9/2002 | Charles | |
| 6,480,229 B1 | 11/2002 | Driscoll, Jr. et al. | |
| 6,615,020 B2 | 9/2003 | Richter et al. | |
| 6,637,883 B1 | 10/2003 | Tengshe et al. | |
| 6,999,714 B2 | 2/2006 | Pfenninger et al. | |
| 7,206,022 B2 | 4/2007 | Miller et al. | |
| 7,242,425 B2 | 7/2007 | Driscoll, Jr. et al. | |
| 7,245,273 B2 | 7/2007 | Eberl et al. | |
| 7,391,887 B2 | 6/2008 | Durnell | |
| 7,649,690 B2 | 1/2010 | Simkulet et al. | |

(Continued)

FOREIGN PATENT DOCUMENTS

| | | |
|---|---|---|
| CN | 101393325 A | 3/2009 |
| CN | 203118082 U | 8/2013 |
| EP | 2026264 A2 | 2/2009 |

*Primary Examiner* — Sam Yao
*Assistant Examiner* — Evan Page
(74) *Attorney, Agent, or Firm* — Edell, Shapiro & Finnan, LLC

(57) ABSTRACT

A method and system provides security for remotely administered tests to examinees at respective remote locations by providing, with a head mounted image capture device for each examinee, video and data signals representing a series of images including both the forward field of view of the examinee and the examinee's eyes. The video and data signal are transmitted to a central sever which logs the data and makes it available in real time to a proctor. The image capture device may be any head mounted device equipped with one or more cameras arranged to provide the necessary images of the examinee's field of view and eyes and may comprise a frame for eyeglasses, a resiliently flexible head attachment clamp, or any device that may be secured to the examinee and support a camera or cameras having suitably directed viewing fields.

13 Claims, 27 Drawing Sheets

(56) References Cited

U.S. PATENT DOCUMENTS

| | | | |
|---|---|---|---|
| 8,164,655 B2 | 4/2012 | Lablans | |
| 8,713,130 B2 | 4/2014 | Logan et al. | |
| 8,736,680 B1 | 5/2014 | Cilia et al. | |
| 2001/0032335 A1* | 10/2001 | Jones | H04L 29/06 725/105 |
| 2002/0172931 A1 | 11/2002 | Greene et al. | |
| 2003/0071891 A1 | 4/2003 | Geng | |
| 2004/0061831 A1* | 4/2004 | Aughey | A61B 3/113 351/209 |
| 2005/0018069 A1 | 1/2005 | Krogmann et al. | |
| 2007/0048723 A1* | 3/2007 | Brewer | G09B 7/02 434/350 |
| 2007/0109411 A1 | 5/2007 | Jung et al. | |
| 2007/0117083 A1* | 5/2007 | Winneg | G09B 7/00 434/350 |
| 2011/0207108 A1 | 8/2011 | Dorman | |
| 2011/0223576 A1 | 9/2011 | Foster et al. | |
| 2011/0279228 A1 | 11/2011 | Kumar | |
| 2011/0279666 A1 | 11/2011 | Strombom et al. | |
| 2012/0072121 A1 | 3/2012 | Mollicone et al. | |
| 2012/0113209 A1 | 5/2012 | Ritchey et al. | |
| 2012/0224070 A1 | 9/2012 | Burroff et al. | |
| 2012/0290401 A1 | 11/2012 | Neven | |
| 2013/0114850 A1 | 5/2013 | Publicover et al. | |
| 2014/0022402 A1 | 1/2014 | Mishra et al. | |
| 2014/0051047 A1 | 2/2014 | Bender et al. | |
| 2014/0055746 A1 | 2/2014 | Nistico et al. | |
| 2014/0078283 A1 | 3/2014 | Nistico et al. | |
| 2014/0085452 A1 | 3/2014 | Nistico et al. | |
| 2015/0046161 A1* | 2/2015 | Locker | G09B 5/06 704/246 |

* cited by examiner

METHOD AND SYSTEM FOR PROVIDING SECURE REMOTE TESTING

CROSS-REFERENCE TO RELATED APPLICATIONS

The present application is a non-provisional application which claims the benefit of and incorporates by reference the entire disclosure of U.S. Provisional Application No. 61/879,257, entitled "Secure Test Eye Wear System", filed Sep. 18, 2013.

BACKGROUND

Technical Field

The present invention pertains generally to methods and apparatus for administering tests and examinations remotely while maintaining examination security by validating the authenticity of a remotely located test candidate and his/her examination responses that are transmitted to a central location. The invention further pertains to head-mounted image capture devices having one or more integrated cameras that capture images and image data and transmit those images and data to computer networks for processing.

Terminology

It is to be understood that, unless otherwise stated or contextually evident:
  The terms "test", "exam" and "examination" as used herein refer to a process wherein a remotely located test candidate is presented with a series of questions or problems and is required to respond thereto by entering information into a computer for transmission to a centrally located server. The questions or problems are typically presented on the computer screen but may instead be presented orally or in a hard copy document.
  The terms "test candidate", "candidate", "test taker" and "examinee" as used herein refer to a student or other person taking an examination with the use of the present invention.
  The term "device" as used herein refers to the image capture device 200 depicted in FIG. 1 and to all of the embodiments thereof illustrated and/or described herein. Any component described as a "device" component (e.g., "device controller", "device battery", etc.), means such component mounted on or in the image capture device.
  The phrase "remote test terminal" as used herein refers to a computer terminal in an unsupervised environment at which a test candidate takes a test. The unsupervised environment may be located any distance (e.g., many miles) from the centrally located server or may be in a room in the same building in which that server is located.
  The phrases "test sponsor", "test administrator" and "test delivery organization" as used herein refer to an institution or organization administering a test on its own behalf or on behalf of another person or entity.
  The phrase "central location" refers to a location where a system server or other computer equipment is located and arranged to receive information transmitted from remote test terminals. Alternatively, or in addition, an individual for monitoring the received information may be at the central location to monitor the information in real time.
  The terms "forward", "rearward", "front", "rear", "upper", "top", "lower", "bottom", "vertical", "horizontal", etc., are used for convenience to refer to the orientation of a device when normally worn or used by an examinee and are not intended to otherwise limit the structures described and claimed.

Discussion of the Prior Art

The Internet has opened up a world of possibilities for on-line learning for all ages and levels of education. What does not currently exist is a reliable way to validate a person's learning through a secure remote testing environment when a test or exam leads to credit, a certificate, a credential, or a license, etc. More specifically, there is a need for a way to assure the integrity and security of remotely administered tests and examinations (e.g., school exams, exams for college entrance and professional qualification, etc.). The testing industry has been plagued with security breaches prior to, during, and after examinations. The effects of this problem are not limited to primarily testing companies that deliver exams, but include primary, secondary, and higher education institutions, industry, and other test delivery organizations. Security breaches include test form and item theft through brain dumping sites that collect test items and sell them on-line, test candidates capturing images of the exam through various illicit methods, test candidates bringing unauthorized materials to the designated place of testing, and candidates using proxy testers to take their exams. In recent years the number of computer delivered examinations has been growing exponentially, and keeping the networks and exams secure is of utmost concern to the test sponsor and to the test delivery organization.

The latest trend in testing has candidates testing remotely in their choice of settings. This opens up a whole new set of problems for the test sponsor and test delivery organization. Some test delivery organizations, or "remote proctoring" organizations, are claiming to have test security that validates the candidate/examinee, featuring a 360° camera view of what the candidate is doing throughout the examination period. The problem is that neither tripod-set cameras nor remote or in-person proctors can capture what a candidate is doing 100% of the time.

Accordingly, there is a need to ensure that a remotely located test candidate, while taking an exam, is looking only at the computer screen, or at items that are acceptable to the test sponsor. These items could be, for example, calculators, paper and pencil for calculations, prescribed books if permitted, and other items that the testing sponsor has approved for use during an exam.

OBJECTS AND SUMMARY OF THE INVENTION

Therefore, in light of the above, and for other reasons that will become apparent from the descriptions below, it is one object of the present invention to provide improved methods and apparatus for assuring that an examinee, located in a remote environment or an environment where there is no in-person proctor, views or is looking only at predetermined items such as a computer screen or other test-related items acceptable to the test administrator.

It is another object of the invention to provide an improved method and apparatus for enhancing remote test security in real time by 360°-monitoring of both a test candidate's field of view and that candidate's ocular movements, and streaming the monitoring information to a server at a central location where it can be analyzed in real time and/or stored for analysis at a later date.

It is still another object of the invention to provide improved head mounted image capture devices to be worn by an examinee during a test that can monitor both the forward field of view from the device and the position and movement of the examinee's eye or eyes.

The aforesaid objects are achieved individually and in combination, and it is not intended that the present invention be construed as requiring two or more of the objects to be combined unless expressly required by the claims attached hereto.

With the foregoing objects in mind, in accordance with one aspect of the invention a method and system provide security for remotely administered tests to examinees at respective remote locations by providing:

- with a head mounted image capture device for each examinee, video and data signals representing a series of images including the forward field of view of the examinee and the examinee's eyes;
- for each examinee, transmitting the video and data signals from the examinee image capture device to the examinee computer;
- transmitting the video and data signals from each examinee computer to a central location via a transmission link; and,
- at a centrally located system server, receiving the video and data signals from said transmission link for each examinee and saving information representing said signals in files dedicated to respective examinees.

The examinee image capture device may be any head mounted device equipped with one or more cameras arranged to provide the necessary images of the examinee's field of view and eyes and may comprise a frame for eyeglasses, a resiliently flexible head attachment clamp, or any item that may be secured to the examinee and support a camera or cameras having suitably directed viewing fields.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

DESCRIPTION OF THE PREFERRED EMBODIMENTS

The following detailed explanations of the drawings and the preferred embodiments reveal the methods and systems of the present invention.

Figure 1:
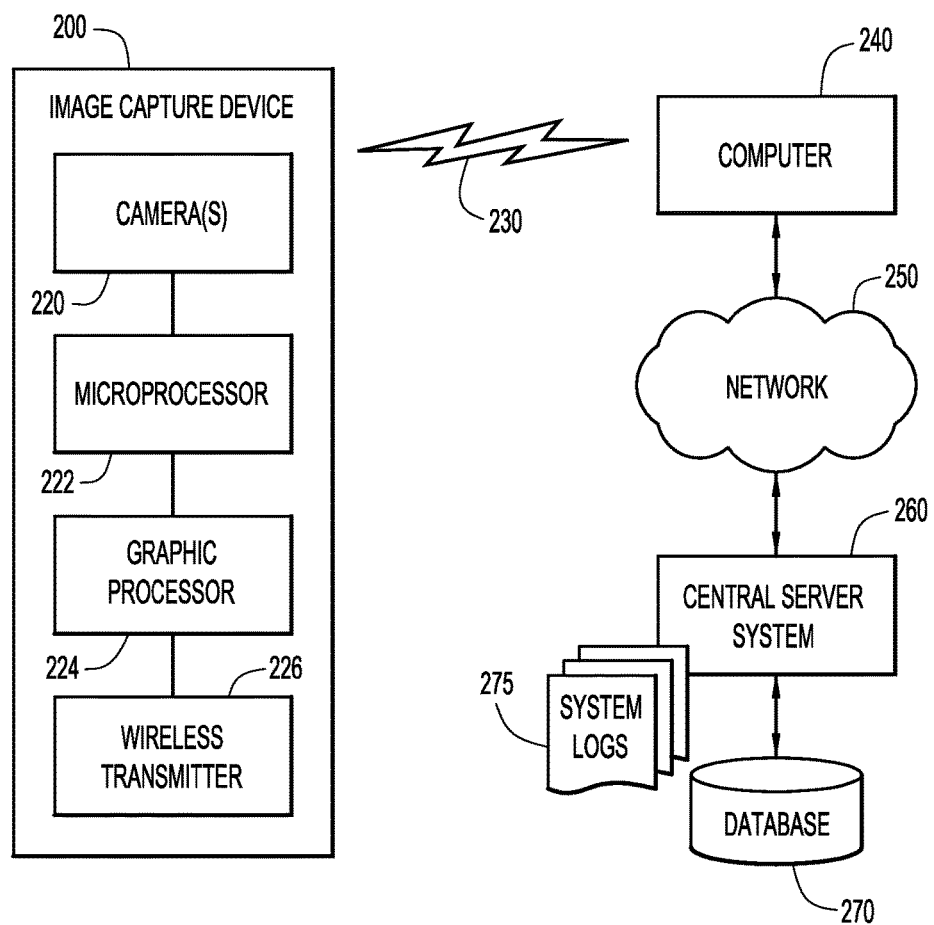
FIG. 1 is a functional block diagram illustrating an exemplary embodiment of a method and system according to the present invention.

Referring specifically to FIG. 1 of the accompanying drawings there is illustrated a functional block diagram of an embodiment of the system and method of the present invention in connection with a remotely located examinee taking an exam administered from a central location. Each remotely located examinee in this embodiment is provided with an examinee image capture device 200 that communicates with a computer 240 at his/her remote location via a link 230 (e.g., a wired or wireless connection). Device 200 is a head mounted unit such as an eyeglasses frame, a resiliently flexible head clamp, or other unit capable of being supported on the examinee and carrying one or two cameras 220, as needed for the embodiments described hereinbelow, that can view the examinee's field of view and the examinee's eyes. The camera system permits capture of the examinee's 360° field of view during an exam. Computer 240 may be a personal desktop computer, laptop computer, or the like, that is configured to communicate with device 200 via communication link 230. Computer 240 and the image capture device 200 may include wireless transmission components to enable the communication link 230. The wireless connection can be made by using, e.g., Bluetooth radio technology, communication protocols described in IEEE 802.11 (including any IEEE 802.11 versions), etc. Computer 240 may access the Internet or other communication channel 250 to gain access to a centrally located secure testing server system 260. The video streaming data from the image capture device 200 is received at the server system 260 where it is monitored (in real time or after the exam) and saved in system logs 275 in a server database 270 on a per examinee basis. That is, there is typically an individual file (virtual or actual) in the database for each examinee.

Figure 2:
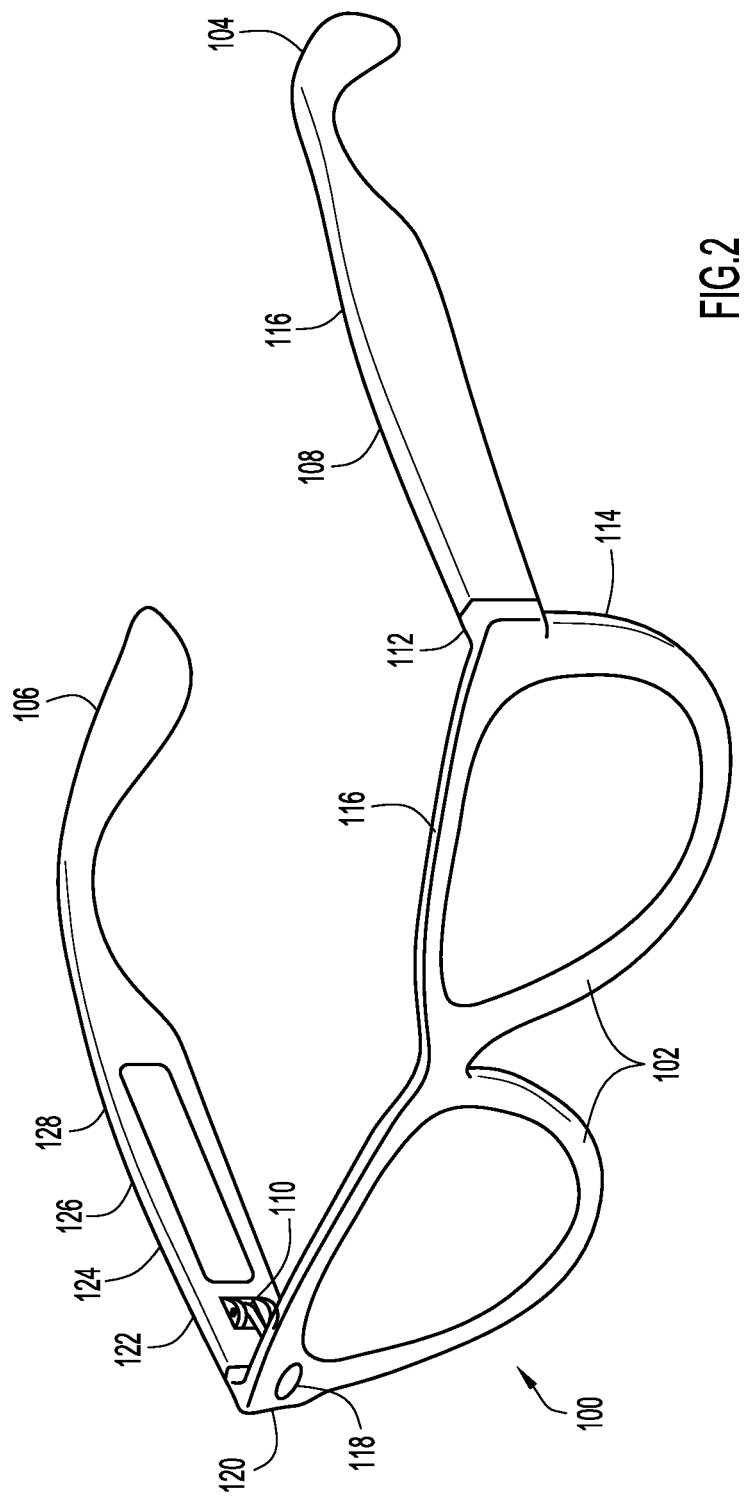
FIG. 2 is a view in perspective from the front and left side of a first eyewear assembly embodiment of a head mounted image capture device according to one embodiment of the present invention.
Figure 3:
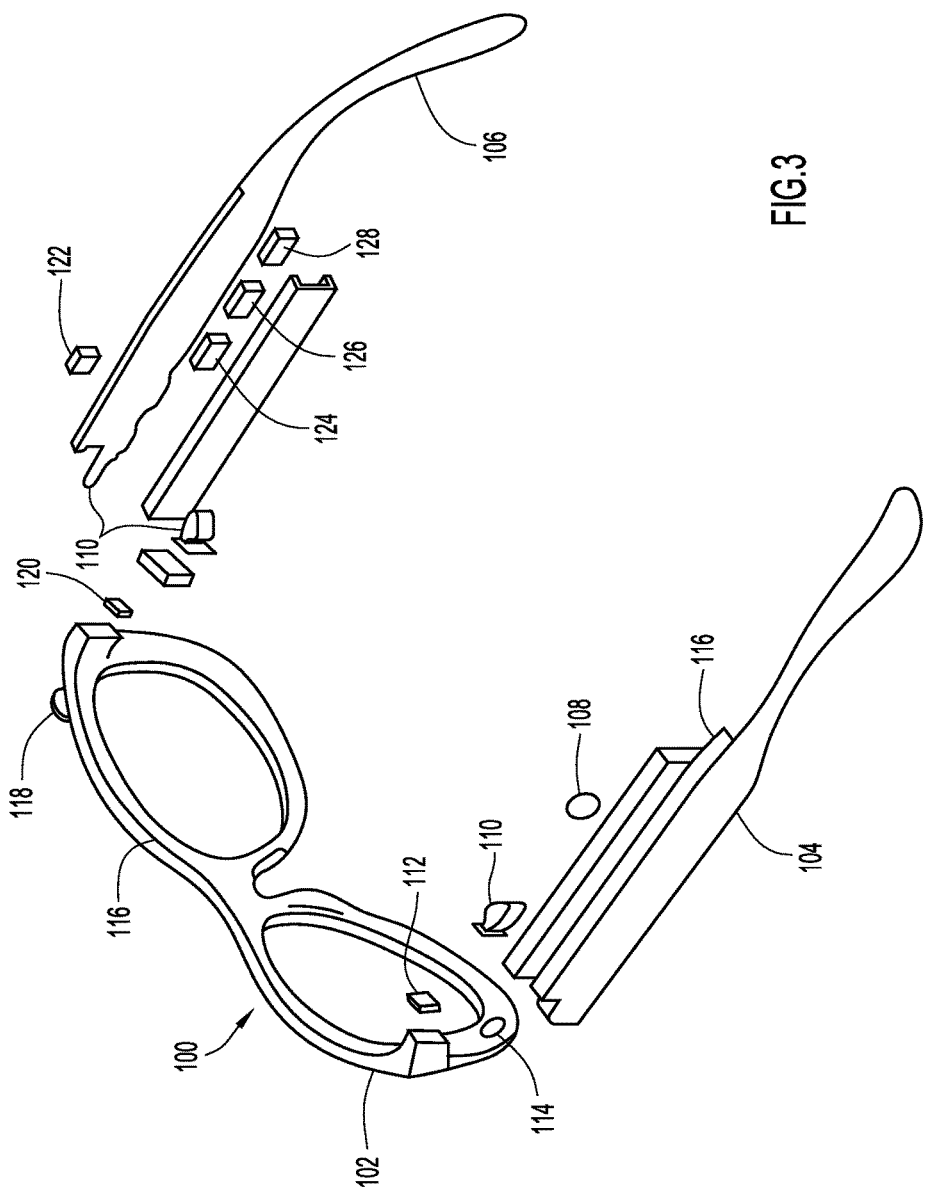
FIG. 3 is an exploded rear view in perspective of the eyewear assembly embodiment of FIG. 2.
Figure 4:
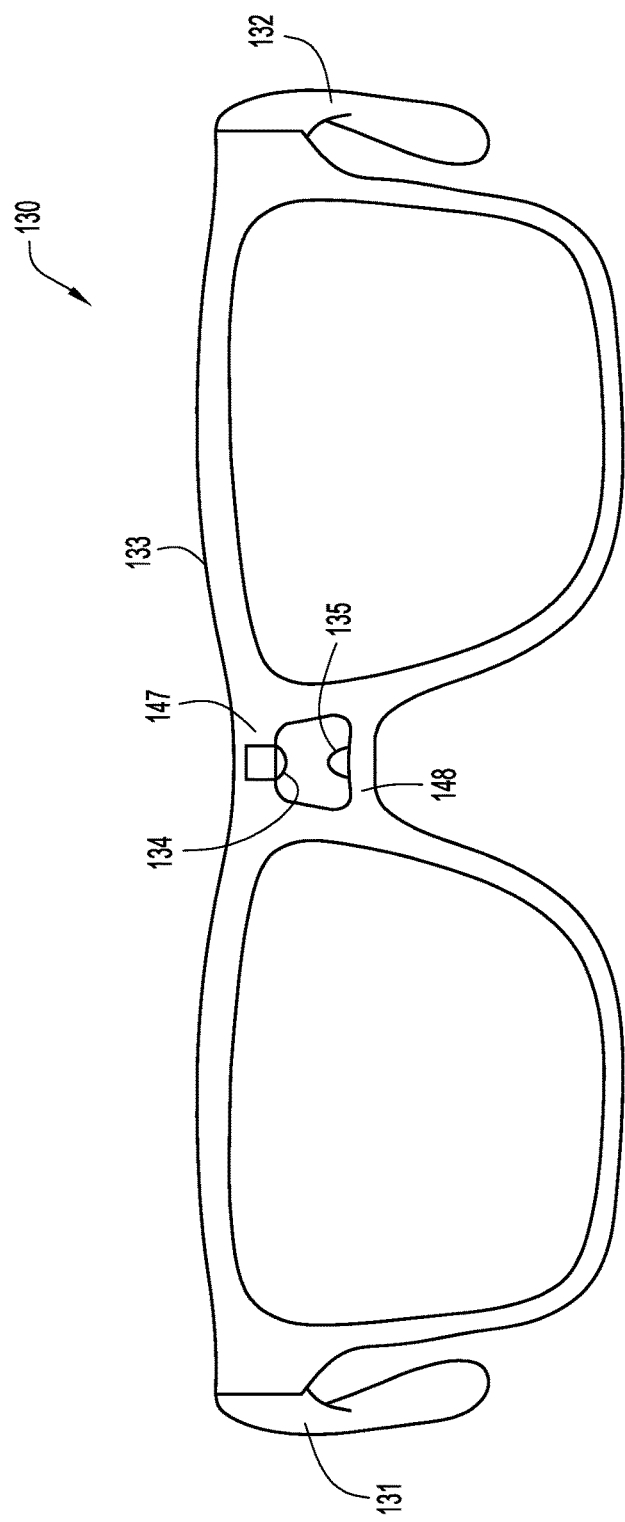
FIG. 4 is a front view in elevation of a second eyewear assembly embodiment of a head mounted image capture device according to the present invention.
Figure 5:
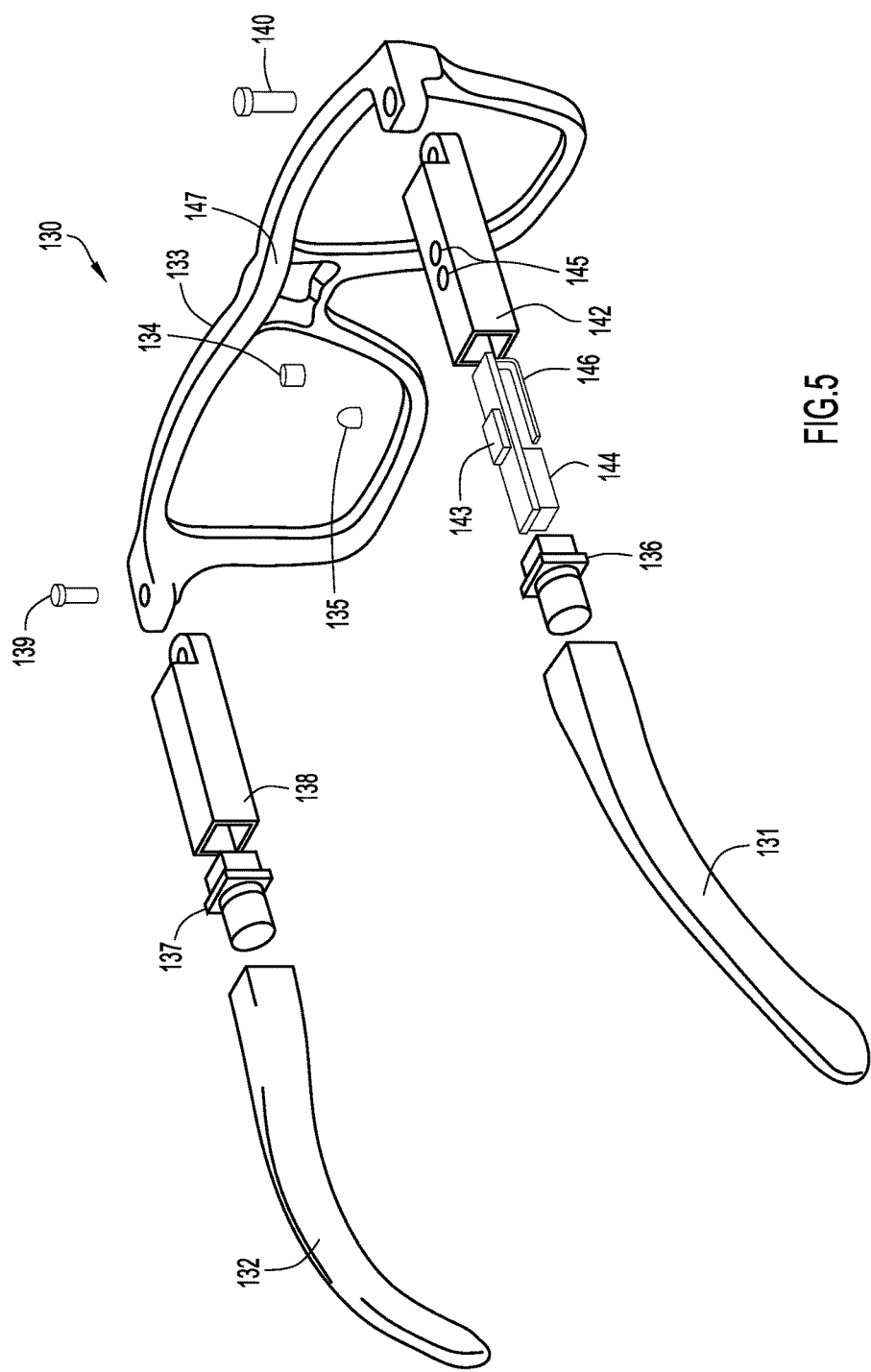
FIG. 5 is an exploded rear view in perspective of the eyewear assembly embodiment of FIG. 4.

FIGS. 2 and 3 illustrate an exemplary unit 100 comprising one embodiment of an image capture device of the present invention. Unit 100 is shown in the form of eye-gear, specifically an eyeglasses unit with or without lenses. The elements of the unit 100 include a frame or rims 102 and two side arms or temples 104 and 106. Hinges 110 connect the left temple 104 and right temple 106 to the front rims 102. The rims 102 and temples 104, 106 may be formed of solid or hollow structural plastic or metal or similar material as to allow for the connections and functions described herein, and particularly for wiring and/or other electrical connections to be internally routed through the eye-gear.

Unit 100 may have mounted thereon or built into the unit a front facing video camera 120 and lens 118, an ocular tracking video camera 112 and lens 114, and a device processing system which includes a wireless transmitter 124, a microprocessor 126 and a graphics processor 128, all of which may be connected to and/or mounted on a circuit board.

The on-board device processing system is shown positioned on temple 106 of the eye-gear 100 and is used for scaling and streaming real time front facing video to the remote secure testing server 260 (FIG. 1). The front facing video camera/recorder 120 is forward facing and positioned at the junction between temple 106 and right rim 102 with its lens 118 located exposed at the far upper right hand side of right frame or rim 102. The ocular tracking video camera/recorder 112 is positioned on the inside of the left frame or rim 102. Both video cameras/recorders 112 and 120 provide continuous video streams of front facing images and ocular eye images, respectively. The video recorders 112 and 120 may be standard definition video recorders limited to recording in low resolution, such as video graphic array (VGA) resolutions of 640×480 pixels.

More specifically, the front facing video recorder 120 may be embedded in a corner between the right frame or rim 102 and the proximal end of the right temple 106 with its lens 118 protruding through the frame. The ocular tracking video camera 112 may be embedded in a corner between the left rim 102 and the proximal end of the left temple 104. The video recorder lens 114 is angled to face rearwardly to capture direct images of the examinee's eye from a peripheral vantage point. The two cameras allow the image capture device 100 to capture the user's eye movements while viewing the front facing images during the taking of an exam.

Both video recorders 112 and 120 are connected to a graphic processor 128, the microprocessor 126 and the wireless transmitter 124. Both the front facing video signals and the ocular video signal for the device 100 are transmitted to the examinee's computer 240 from their respective video cameras 120 and 112 by the wireless transmitter 124 and then remotely streamed to the secure centrally located testing server 260 (FIG. 1) as described.

The video transmission data may be streamed from the video recorders 112 and 120 with a resolution of 640×480 pixels to the graphic processor 128. The graphic processor 128 may encode and scale the video data into a particular video compression format such as H.264 video stream, and scale the video into a 0.5 Mbps stream with a resolution of 480×360 pixels. The encoded and scaled video stream from the graphic processor 128 is transmitted to the microprocessor 126, which packages the data for the transmission via the wireless transmitter 124. The wireless transmitter 124 transmits the data to the secure testing server 260 via the examinee's computer 240 (FIG. 1). The front facing and ocular tracking video streams are time keyed or synchronized with each other.

The front facing camera 120 captures the front facing image as viewed by the examinee wearing device 100. A front facing image is a continuous video stream of single frame front facing images. The front facing images may be captured using a variety of different standardized imaging codecs (e.g. MPEG, MPEG4, series of JPEG images etc.) or a proprietary imaging protocol. The front facing image includes anything viewed by the examinee who typically sits at a remote testing station or terminal (e.g., for a desk top computer or laptop), the front facing images typically including various items such as the computer monitor, keyboard, mouse, and calculator or other items that are permitted in the remote testing environment. The front facing images are obtained continuously in real-time, recording everything viewed by the examinee wearing device 100.

Prior to operating the system, the examinee is asked to execute a calibration test where the user is instructed to look in various directions or at various objects, as described hereinbelow in relation to FIGS. 23A and 23B. In the process, device 200 transmits information to the secure testing server system 260 so that the system log 275 is tracked and saved. The information gathered by the image capture device will be continuously streamed to the secure testing server 260 in real time.

The image capture device utilizes both the front facing image video camera 120 and the ocular video camera 112 which also provides video signals that may be captured using a variety of different standardized imaging codecs (e.g. MPEG, MPEG4, series of JPEG images etc.) or proprietary imaging. The eye images can be analyzed along with the front facing images to determine the user's ocular movements. Those ocular movements can be correlated to the forward facing images captured by the front facing camera 120 to determine what the user was directly looking at when viewing the front facing images through the eye gear.

The ocular tracking camera 112 captures an eye image of the user in real time while the user is viewing the front facing image when wearing the eye gear device 100. The ocular tracking camera captures the eye images contemporaneously with the front facing camera 118, and the two captured video streams are time keyed or synchronized with each other. The front facing images and the ocular images are transmitted in real time to the testing server system.

If the ocular tracking camera option is included in the eye gear, prior to operating, the examinee is asked to execute a calibration test. The calibration software must be downloaded after the eye gear is turned on and wireless connection has been made between the eye gear 100 or 200 and the computer 240. The examinee is instructed to look in various directions or at various objects. During the calibration the pupil location with each eye image may then be calibrated to the corresponding items captured in the front facing images (e.g., computer monitor, keyboard, and calculator).

Image capture device 100 transmits information to the secure testing server so that system log information (i.e., the ocular tracking images and front facing images) for the examinee can be captured and logged. This log functions as a history of what the examinee was viewing during the exam and his/her ocular eye movements during the exam.

The information gathered by the image capture device 100 (or, generically, 200) is continuously streamed to the central testing secure server 260 in real time. Thus, if the image capture device detects a constant image on the ocular or front facing download for more than a predetermined time (e.g., five) minutes, the remote proctor will send a message to the examinee; if no response is received from the examinee, the exam will be shut down. This predetermined time may be selected to accommodate a test sponsor's particular exam content or format (e.g., looking at a long passage or a diagram that is complex)

The device 100 shown in FIGS. 2 and 3 has an On/Off switch 122 located on right temple 106. Switch 122 must be activated in order for the device to function. Once the device has been turned on, the testing software provided by the test delivery organization prompts the examinee to download the system program. This program allows the device to be calibrated and also runs a security check to validate that the unique device ID number matches the examinee's test profile. If it does not match, the image capture device software shuts down and the exam does not proceed.

The device battery 108 typically has a lifespan of at least four hours and preferably at least eight hours; the battery is preferably rechargeable. Battery 108 may be located in the left temple 104 of the eye gear and coupled by wiring 116 through the frame to the electronic components embedded in the right temple 106 to provide power to the components. For example, the battery 108 is connected to the video cameras 112 and 120, wireless transmitter 124, microprocessor 126 and the graphic processor 128. The wiring 116 may be extended from the battery 108 on the left temple 104 through the frame or rim 102 to the right temple 106 through the hinges 110 that couple the right and left temples to the frame or rim 102. The wiring 116 may be embedded in the front frame and the right and left temples via over-molding. For example, wiring 116 may be placed directly into an injection molding tool before hot liquid plastic is injected into the tool to form the front frame and the eye glass temples. This allows the plastic to flow around the wiring which embeds the wiring 116 into the device. Over-molding the wire 116 into the device reduces the space consumed by the wiring which minimizes size requirements needed for the device to accommodate the video cameras 112 and 120 and the electronic components 124, 126 and 128.

FIGS. 4-10 pertain to an exemplary device 130 comprising another embodiment of an image capture device of the present invention. Device 130 is also shown in the form of eye-gear or, specifically, a frame 133 for eyeglasses which may or may not have lenses mounted in the frame. The frame is comprised of elements that allow for the expansion of temples 131, 132 through the addition of respective temple adjustment plugs 136, 137, and for expansion of or addition to the device processor system through the left arm pivot case 138 which may house additional processors, cameras, or other elements as/if needed. A left hinge plug 139 connects the proximal end of left eyeglass temple pivot case 138 to the front eyeglass frame 133. The opposite or distal end of pivot case 138 is connected to the left eyeglass temple adjustment plug 137 from which the distal end of left temple 132 extends. A right hinge plug 140 of frame 133 is pivotally connected to the proximal end the device controller case 142. The opposite or distal end of device controller case 142 is connected to the right temple adjustment plug 136 from which the distal end of temple 131 extends. The frame and temples may be formed of solid structure of plastic or metal or of a hollow structure of similar material as to allow wiring and component interconnections to be internally routed through the eye-gear.

The device controller case 142 and all embedded elements may be placed on the right or left side of the front frame 133 and connected by using the hinge plugs 139 and 140. The embedded elements included in controller case 142 are a device processor 143, a battery 144, control buttons 145, a device transmitter 146, an ocular tracking video camera including a very wide angle (i.e., fish eye) lens 134 and a 360° mirror 135. The pivot case 138 may be placed on the right or left side of the front of frame 133 and connected by using the right or left hinge plugs 140, 139. The device controller case 142 and the pivot case 138 may be coupled or attached to a circuit board.

The device processing system is shown to be positioned on the right temple 131; alternatively, it may be positioned on the left temple 132. The device processing system is used for scaling and streaming real time 360° video to the remote secure testing server 260 (FIG. 1).

The fish eye lens 134 of the video camera and the 360° mirror 135 comprise the video recorder or camera system of the eye-gear image capture device 130. The camera fish eye lens 134 is centrally mounted on the bottom side of the frame top bar 147 that joins the two lens support sections of frame 133. The 360° mirror 135 is secured on the top side of the bridge 148 extending between the lens support sections parallel to and spaced below top bar 147. The fish eye lens 134 and mirror 135 are vertically aligned and spaced from one another. The fish eye lens and the 360° mirror combine to provide a continuous video stream of a 360° field of view including eye images of the examinee. The video recorders embedded in the camera and receiving the images from the fish eye lens 134 and mirror 135 may be a standard definition video recorder limited to recording at a relatively low resolution, such as video graphic array (VGA) resolutions of 640×480 pixels. A suitable camera for this purpose is the model 3.4 mm Diameter $\frac{1}{18}$ OV6920 3M COMS Video Camera Module sold by Alibaba.com.

Figure 6:
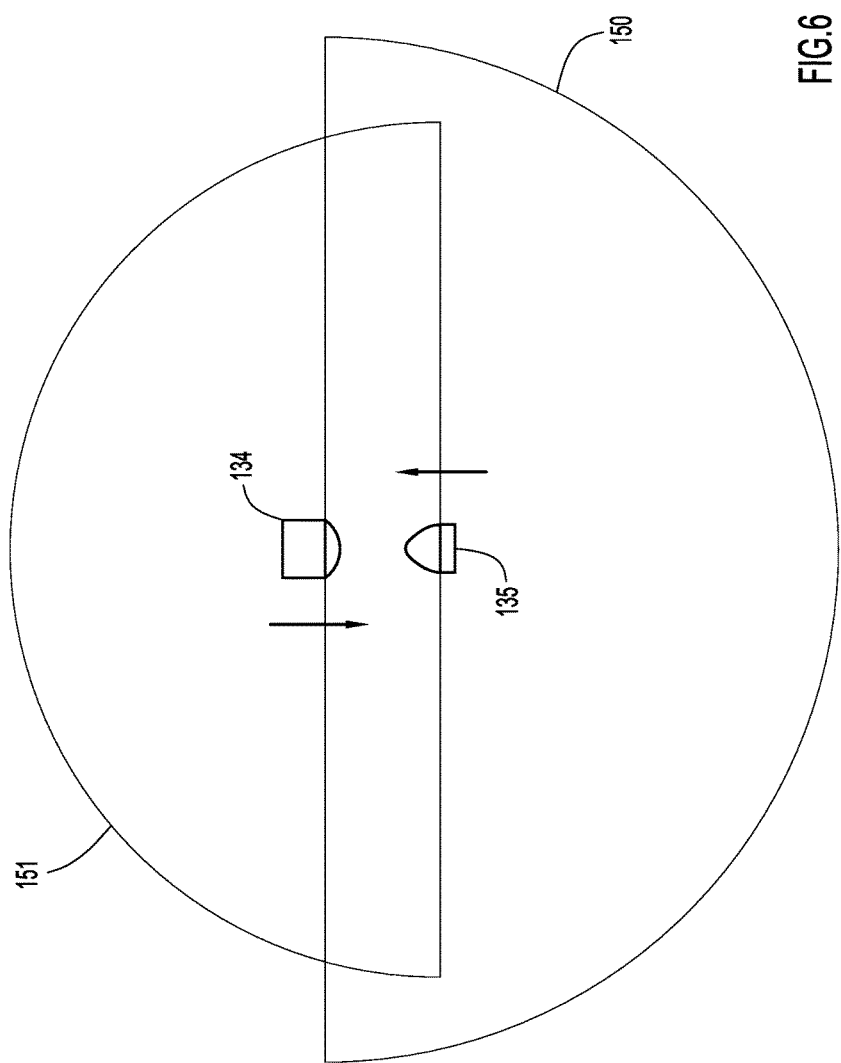
FIG. 6 is a diagrammatic top view illustration of the vertical plane fields of view captured by the eyewear assembly of FIG. 4.
Figure 7:
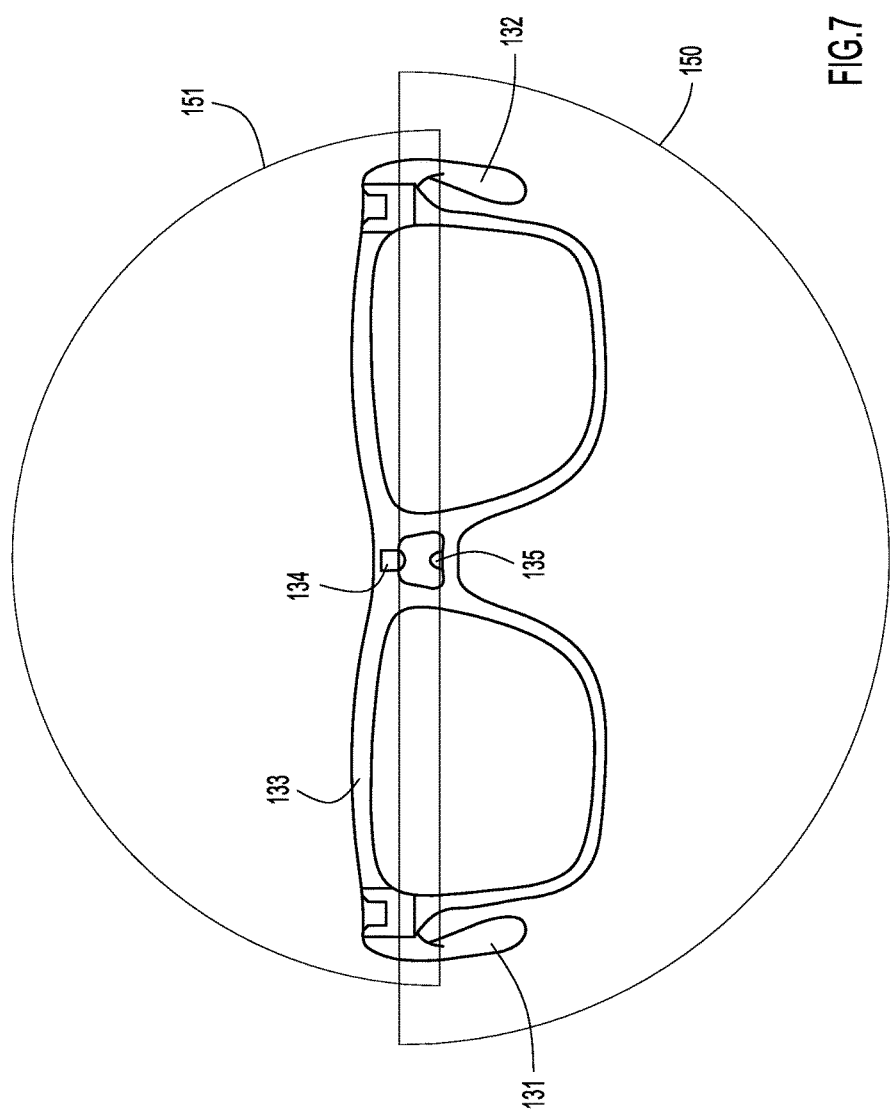
FIG. 7 is a diagrammatic view similar to that of FIG. 6 with the eyewear assembly of FIG. 4 superimposed.
Figure 8:
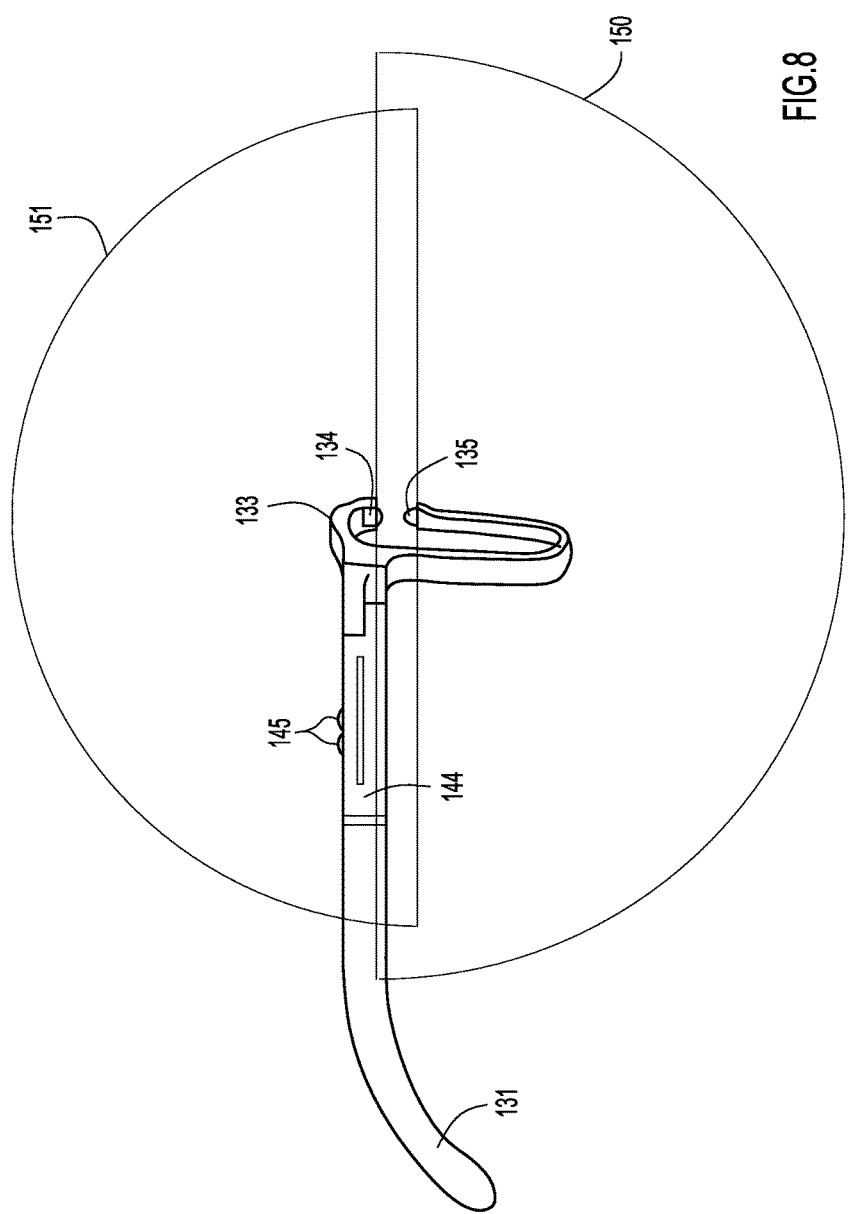
FIG. 8 is a diagrammatic side view illustration of the vertical plane fields of view captured by the eyewear assembly of FIG. 4 with the eyewear superimposed.
Figure 9:
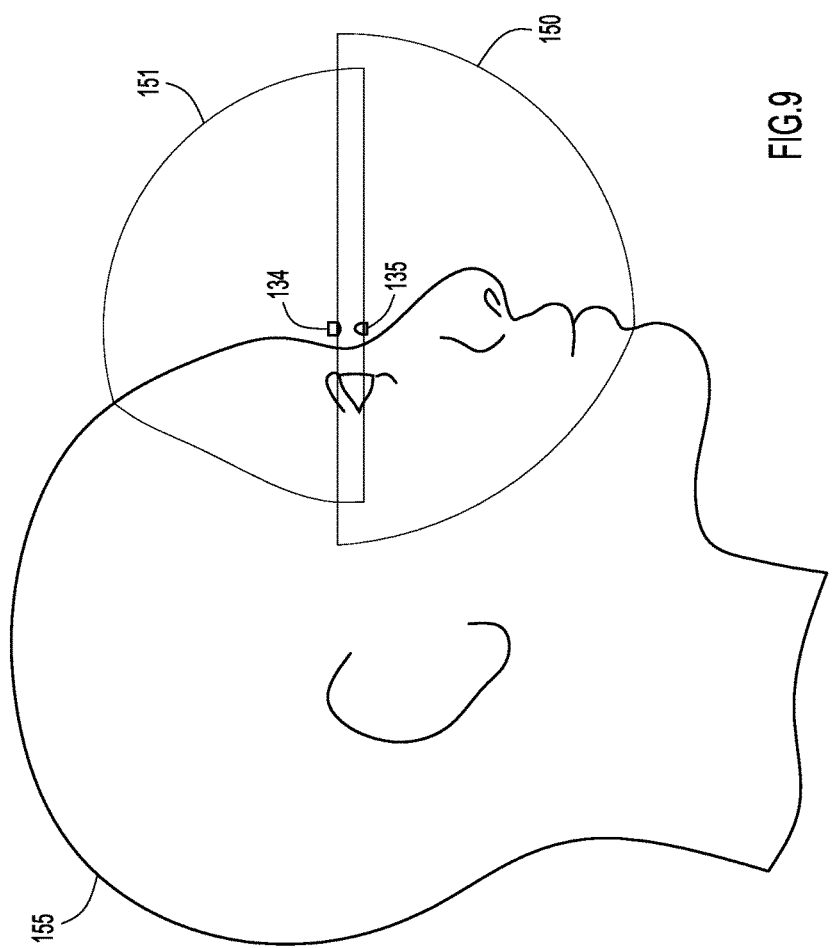
FIG. 9 is a diagrammatic side view depicting the fields of view shown in FIG. 8 superimposed on the head of an examinee.
Figure 10:
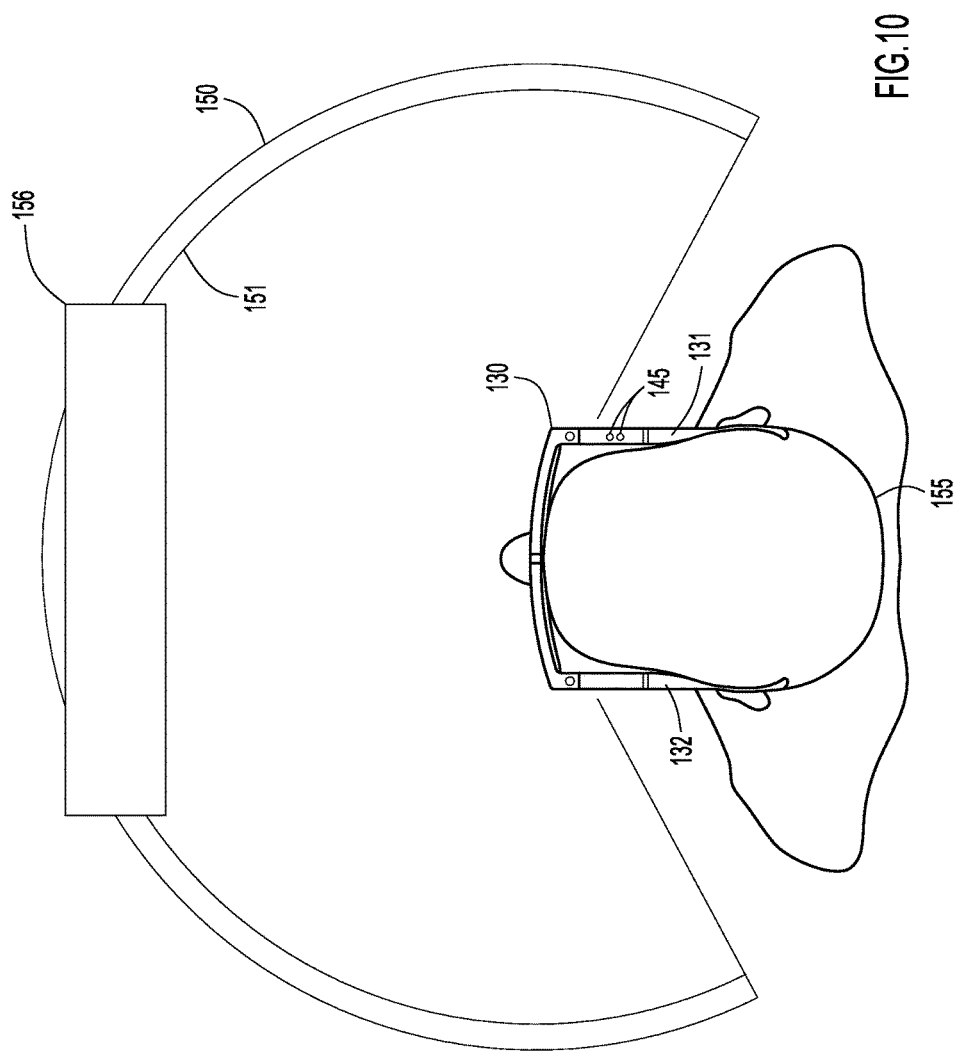
FIG. 10 is view from above depicting an examinee's head and a computer screen with the fields of view captured by the eyewear assembly of FIG. 4 superimposed.

FIG. 6 is diagrammatic view from in front of an examinee showing the functional relationship between the camera fish eye lens 134 and the 360° mirror 135. This allows for a 360° view and recording of examinee's movements and the surrounding area. The field of view of camera lens 134 is represented by semicircle 150 which is actually a slice in the vertical plane of a hemispheric field of view. The field of view of mirror 135, which is reflected into and received by lens 134, is represented by a semicircle 151 which is actually a slice in the vertical plane of another hemispheric field of view. FIG. 7 shows the fields of view 150, 151 as in FIG. 6 with the eye gear superimposed thereon. FIG. 8 shows the fields of 150 and 151 from the right side of the eye gear 130 of FIG. 6. FIG. 9 is a view also from right side showing camera lens 134, mirror 135 and the fields of view 150, 151 relative to the position of an examinee's head 155. FIG. 10 is a view from above the examinee's head showing slices of the respective fields of view 150, 151 in respective horizontal planes and relative to a computer screen 156 that is typically part of the examinee's computer 240 referred to in relation to FIG. 1.

Figure 11:
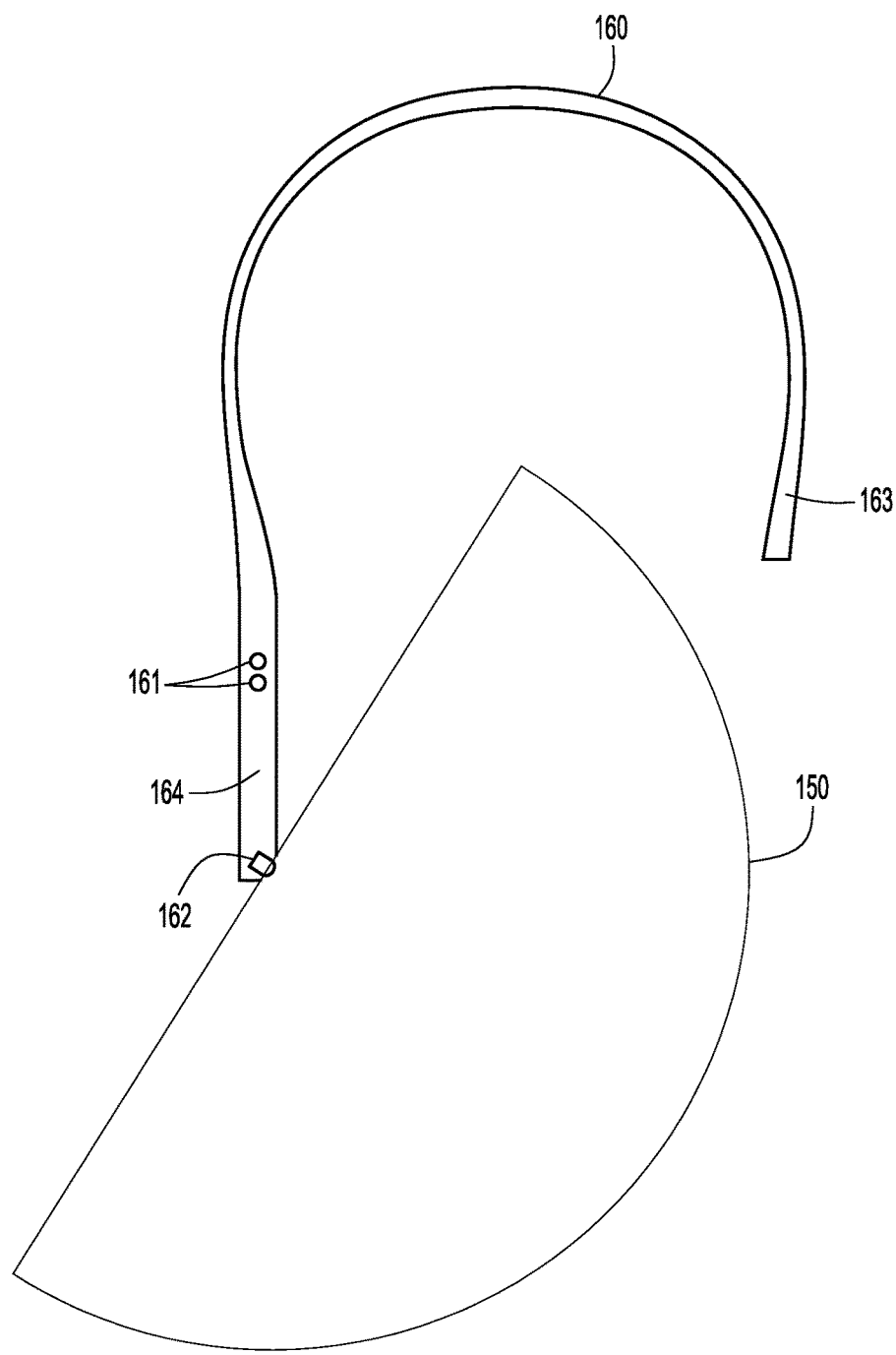
FIG. 11 is a diagrammatic view from above of a first head attachment clamp headset embodiment of the head mounted image capture device according to another embodiment of the present invention with the attached camera field of view diagrammatically superimposed.
Figure 12:
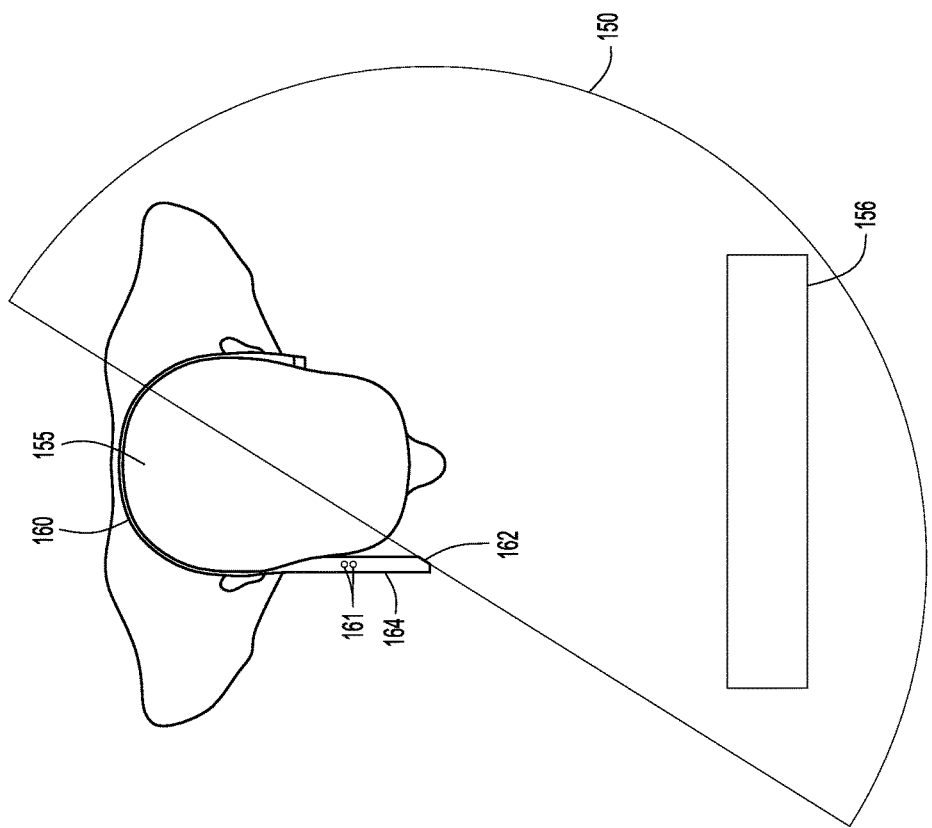
FIG. 12 is a view from above of the head attachment clamp headset of FIG. 11 being worn by an examinee viewing a computer screen with the camera field of view diagrammatically superimposed.
Figure 13:
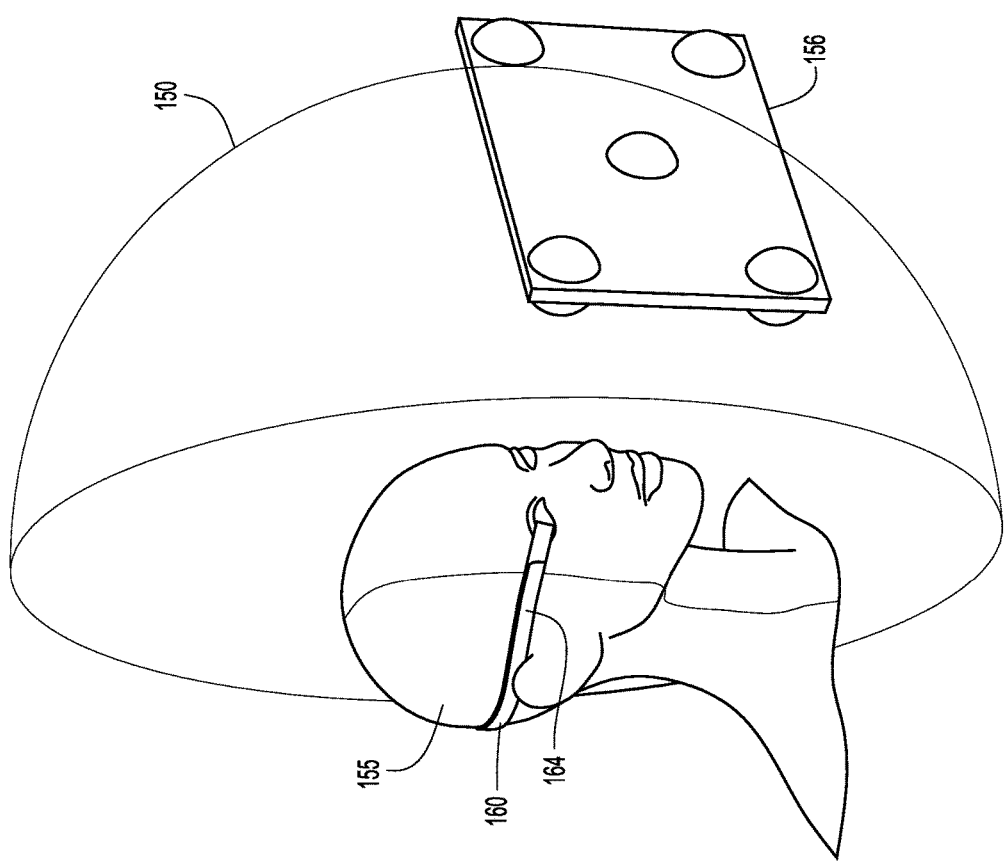
FIG. 13 is a front perspective view depicting an examinee wearing the head attachment clamp headset of FIG. 11 and showing a three-dimensional representation of the camera field of view diagrammatically superimposed.
Figure 14:
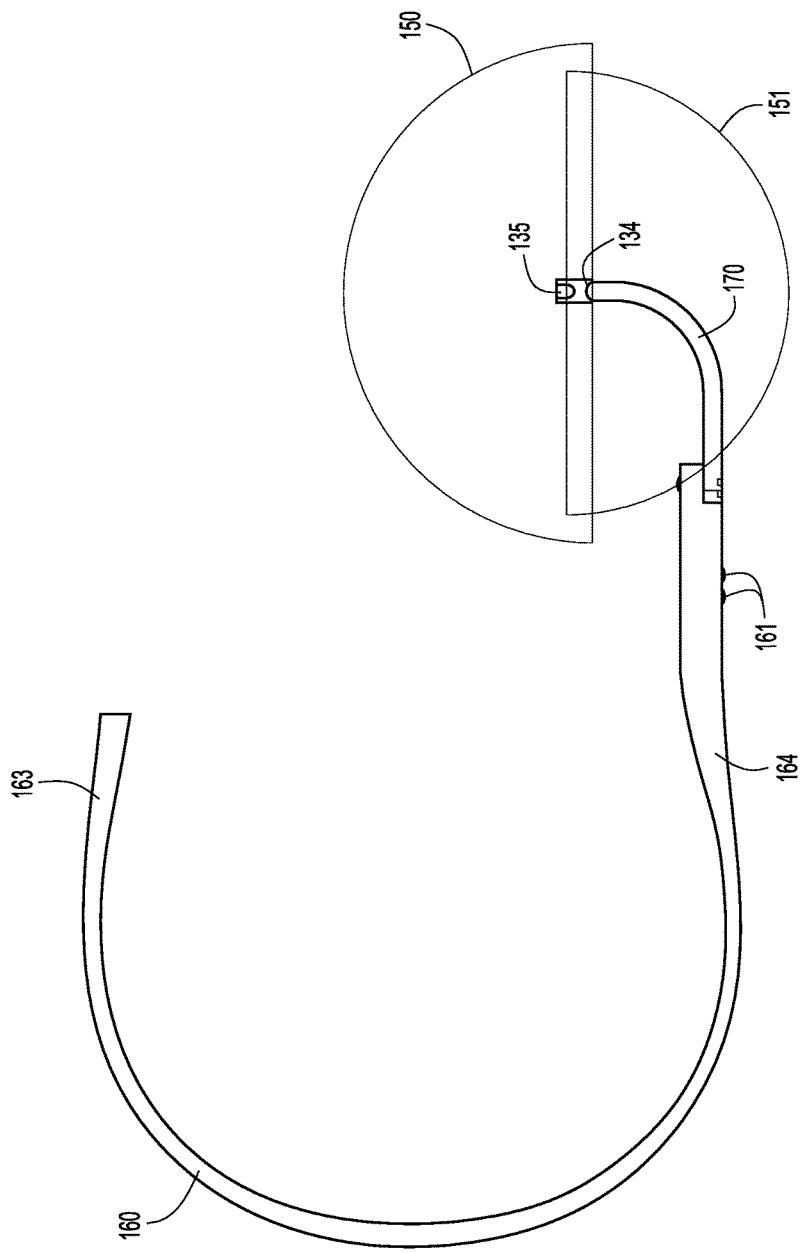
FIG. 14 is a diagrammatic view from above of a second head attachment clamp headset embodiment with a hook camera mount extending therefrom and showing the field of view captured by the device.
Figure 15:
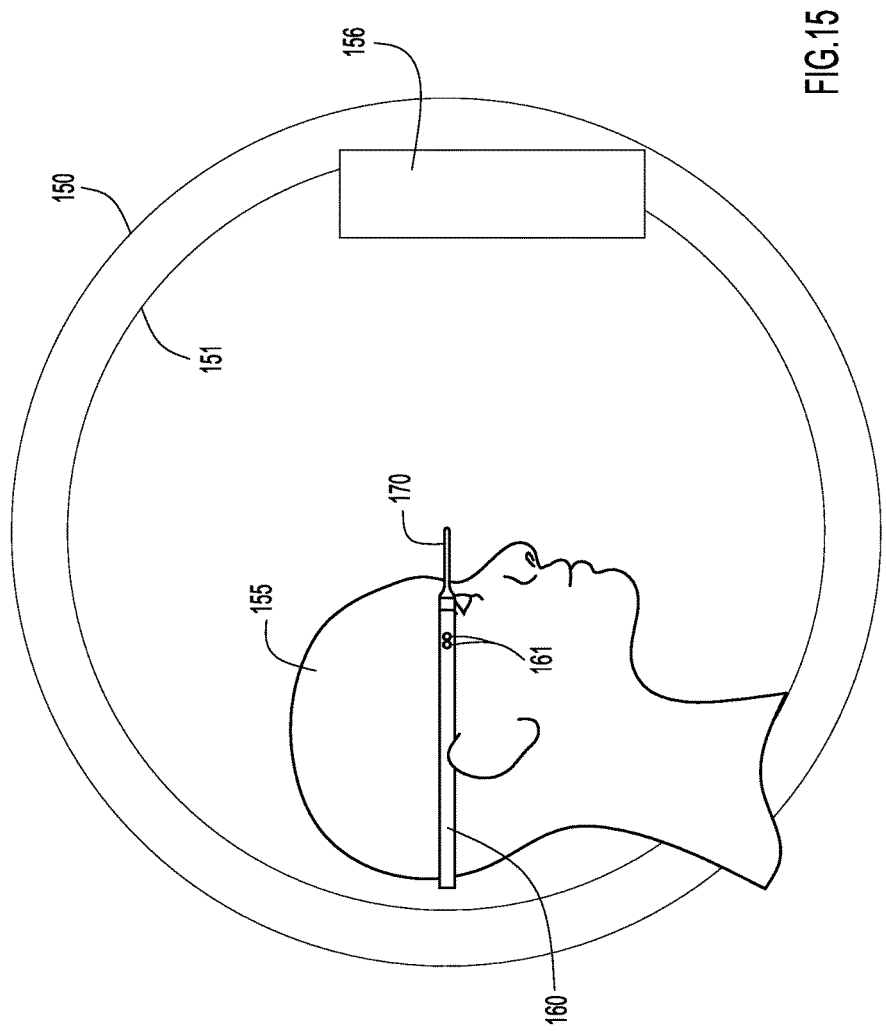
FIG. 15 is a right side view depicting an examinee wearing the head attachment clamp headset of FIG. 14 showing the vertical plane of the field of view captured by the device when viewing a computer screen.
Figure 16:
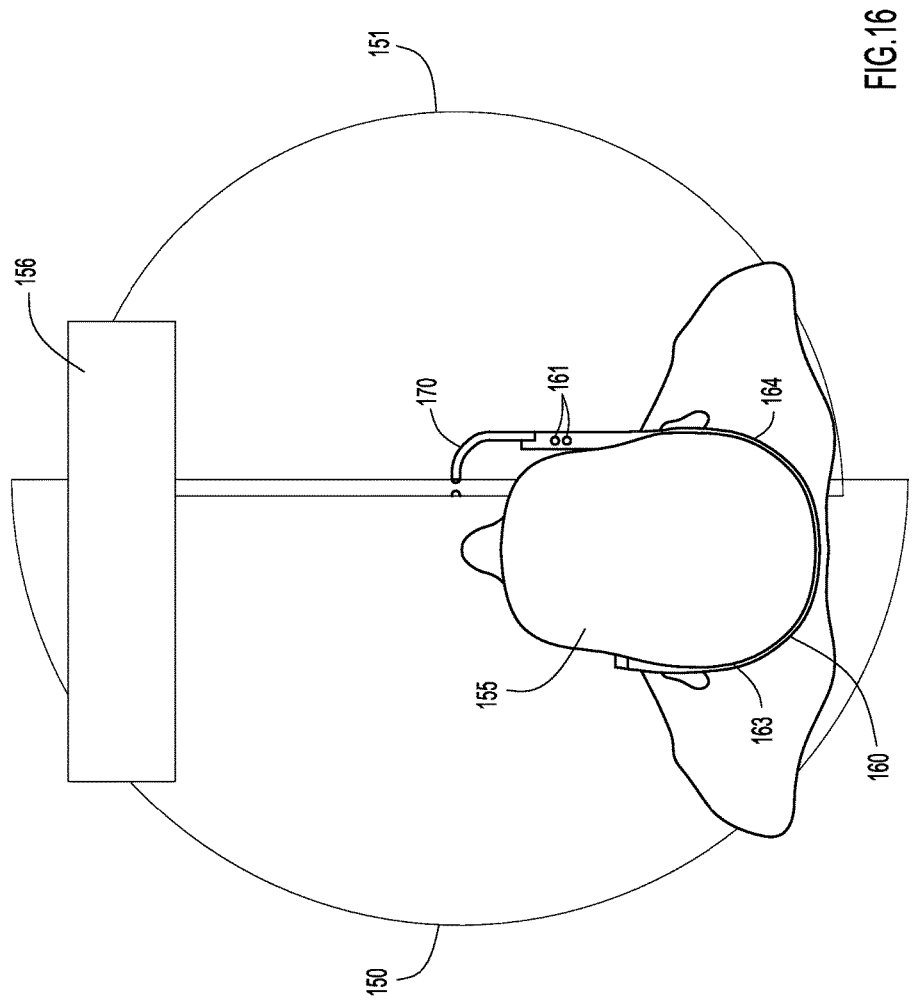
FIG. 16 is a right side view depicting an examinee wearing the head attachment clamp headset of FIG. 14 showing the horizontal plane lane field of view captured by the device when viewing a computer screen.
Figure 17:
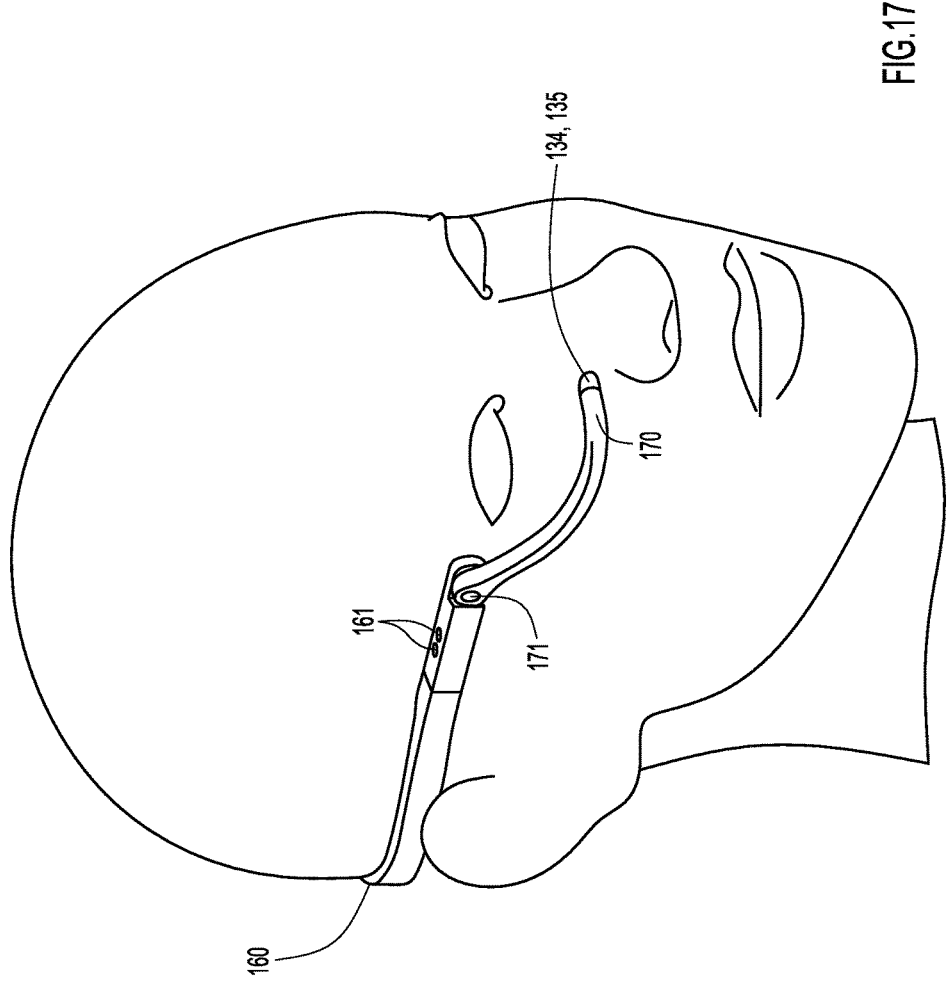
FIG. 17 is a diagrammatic view in perspective of a third head attachment clamp headset embodiment according to another embodiment of the present invention, showing the device worn by an examinee.

FIGS. 11-13 show a resiliently expandable clamp or pincher type headset 160 functioning as an alternative embodiment of the image capture device 200 of FIG. 1. Headset 160 is generally U-shaped with one leg 164 projecting longer than the other leg 163, the legs being resiliently expandable outwardly to permit placement of the headset about a portion of a wearer's head and then released to engage the head. Headset 160 is provided with a device processor or controller 161 that includes the components described in connection with the embodiment of FIG. 5 but not repeated in FIG. 11, namely the device microprocessor, battery, control switches, etc. A camera assembly 162 that typically is comprised of the fish eye camera lens and 360° mirror, described above, is secured at the distal end of the longer leg 164 of the headset so as to project beyond the examinee's eye (i.e., the right eye when the headset is worn as shown in FIGS. 12 and 13). The headset may be worn in either of two orientations so that the longer leg 164 may be on either the right side or left side of the examinee's head, as desired by the examinee. The device controller 161 may be rotatable through 360° about a horizontal axis perpendicular to the longitudinal axis of leg 164 to facilitate calibrating the system for processing as described below in connection with step 306 in FIG. 20A. The field of view 150 as provided by headset 160 is illustrated in FIGS. 12 and 13.

FIGS. 14-17 show an alternative embodiment wherein a hook camera mount 170 may be attached to the headset 160 or to an examinee's own prescription eyeglasses. The hook camera mount 170 embodiment includes the same integrated device controller components described in connection with the embodiment of FIG. 5 but not repeated in FIGS. 14-17, namely the device microprocessor, battery, control button switches, etc. At the distal end of mount 170 there is secured a camera assembly including fish eye camera lens 134 and 360° mirror 135.

The hook camera mount 170 may be positionally rotatable 360° about a horizontal axis perpendicular to the longitudinal axis of leg 164 at their point of attachment 171 to enable optimal positioning of the camera and mirror unit 134, 135, and to facilitate calibrating the system for processing as described below in connection with processing step 306 in FIG. 20A.

Figure 18:
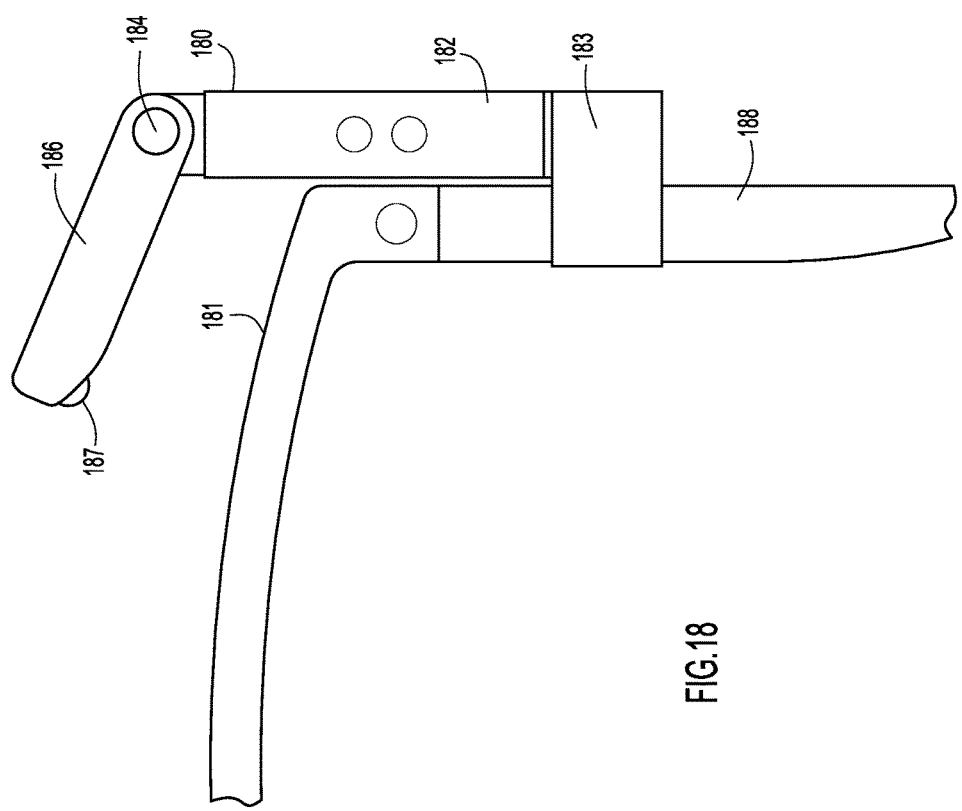
FIG. 18 is a top view in plan of a first camera mount unit attached to a temple of an eyeglasses frame constituting yet another embodiment of the head mounted image capture device according to the present invention.

FIG. 18 illustrates an embodiment of the invention wherein the image capture device 180 is a separate unit that can be selectively attached to and removed from the examinee's own eyeglasses 181. As shown, device 180 includes an elongate housing 182 for the device microprocessor, battery, control button switches, etc., terminating at a pivot joint 184 from which extends an arm 186 having at its distal end a camera assembly 187 that typically is comprised of the fish eye camera lens 134 and 360° mirror 135 described above. Housing 182 is secured at its proximal end to a temple 188 of the eyeglasses 181 by a band 183 which may be an elastic band, a strap or any suitable connection means that permits device 180 to be readily attached securely to eyeglasses 181 during use and removed thereafter. Arm 186 is selectively pivotable about a vertical axis relative to temple 188 to any position in which it can remain during an examination.

Figure 19:
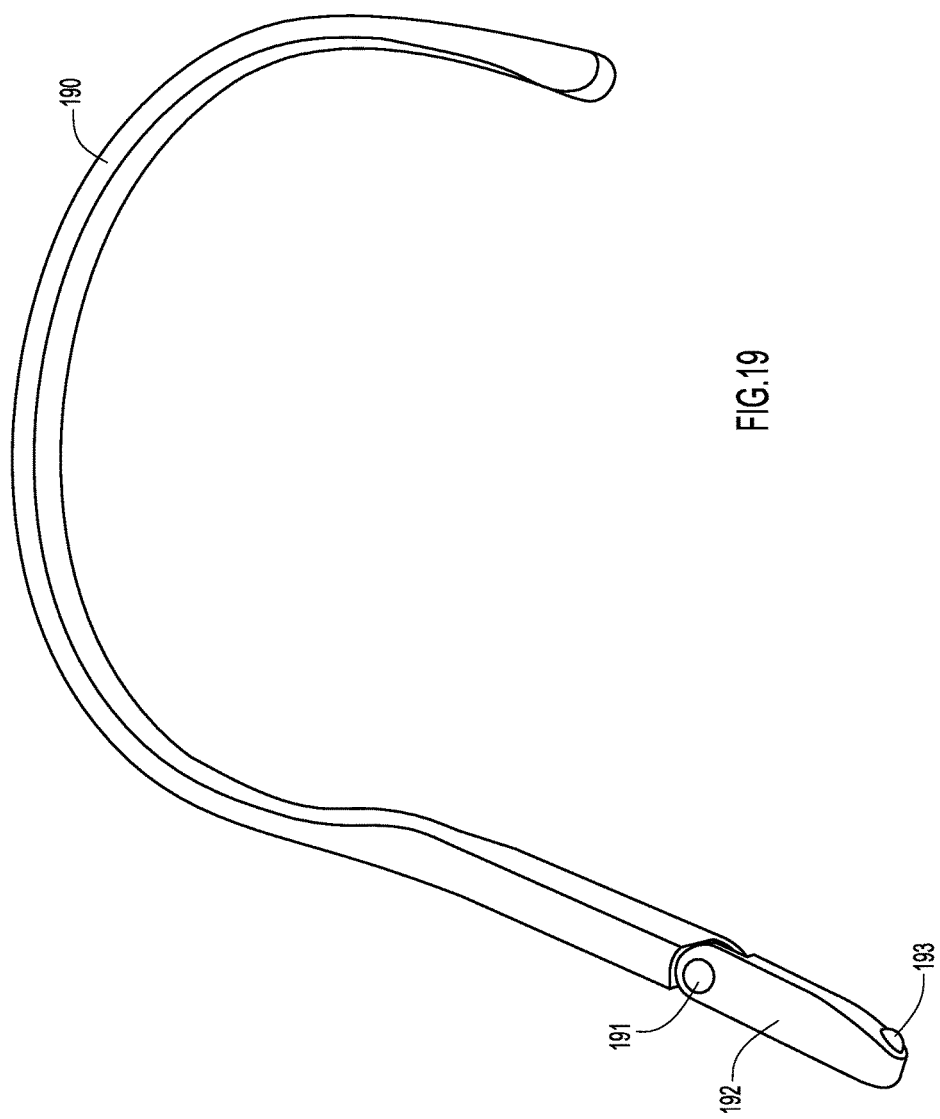
FIG. 19 is a perspective view of a fourth head attachment clamp embodiment of the head mounted image capture device according to another embodiment of the present invention showing field of view captured by the device.

FIG. 19 illustrates an analogous arrangement for a resiliently flexible headset 190 of the type described hereinabove where the long leg of the U-shaped clamp terminates at a pivot joint 191 from which extends an arm 192 having at its distal end a camera assembly 193 that typically is comprised of the fish eye camera lens 134 and 360° mirror 135 described above.

Figure 20A:
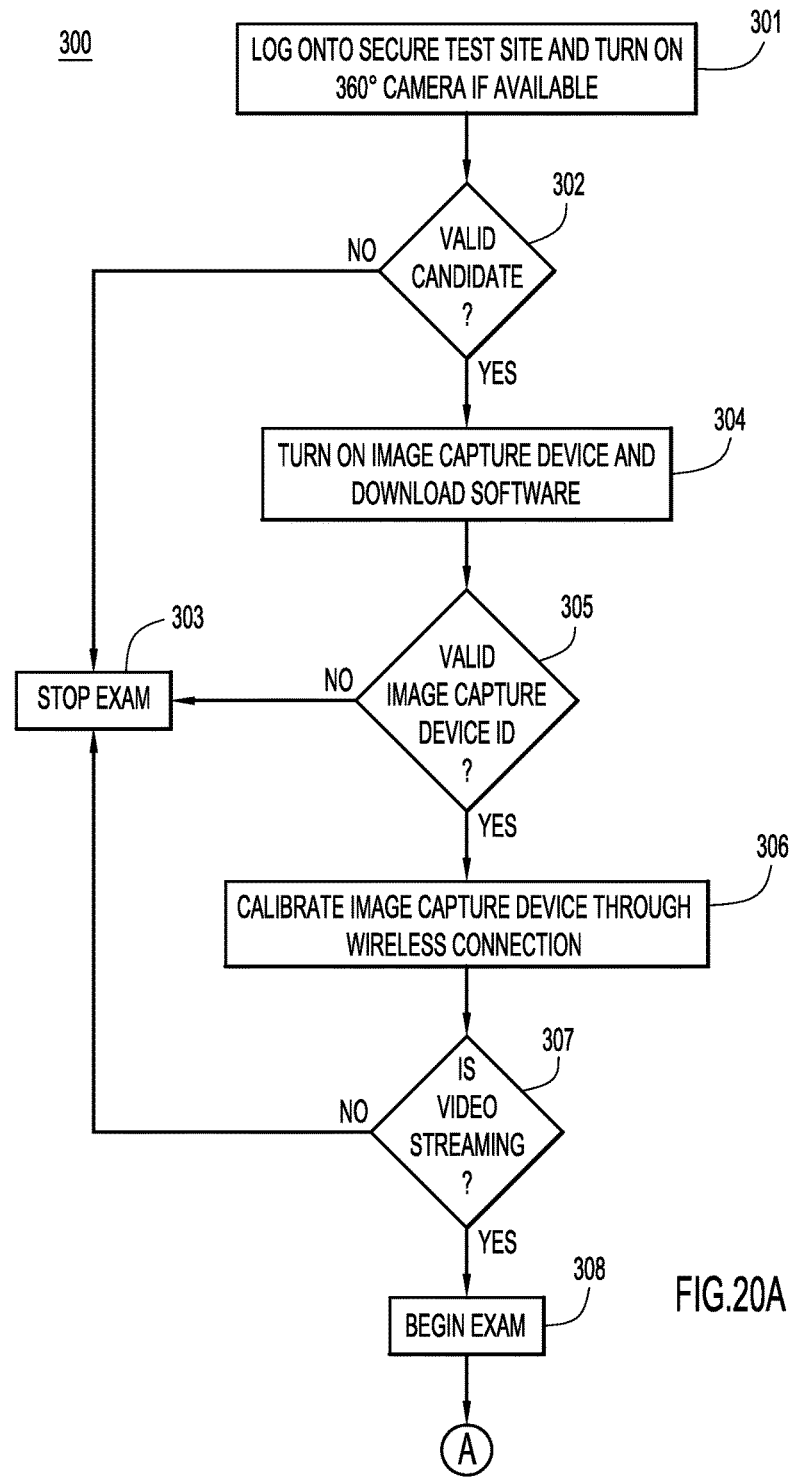
FIGS. 20A and 20B comprise a flow chart illustrating one embodiment of test candidate section processing according to the present invention.
Figure 20B:
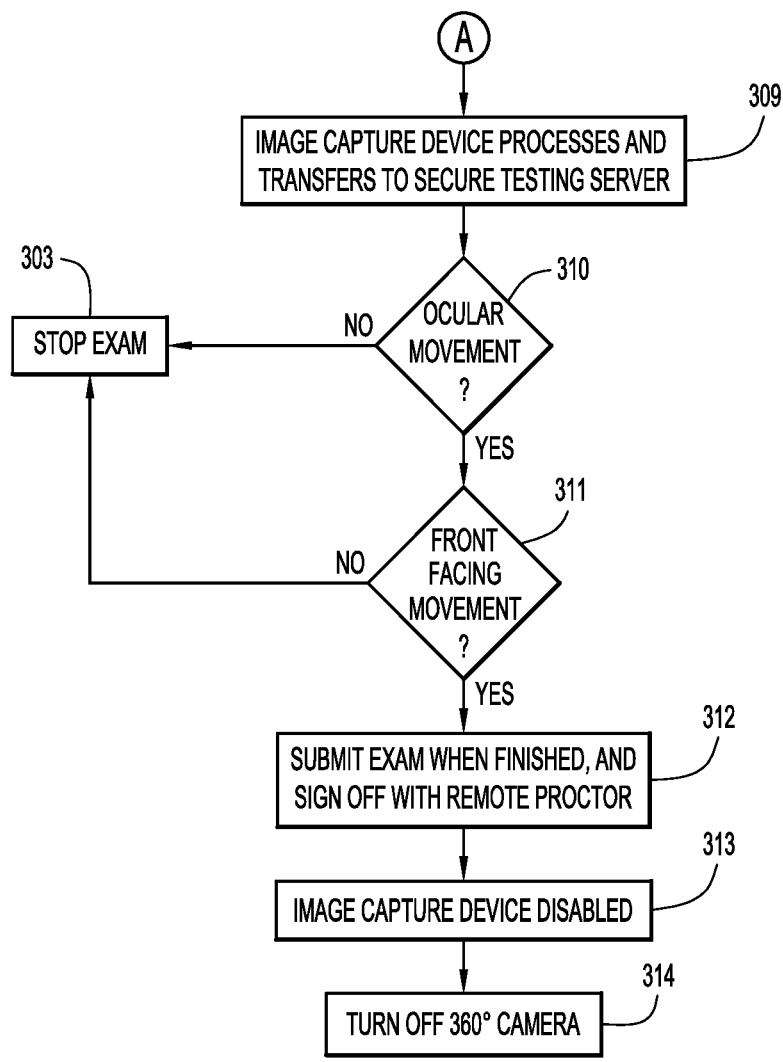

FIGS. 20A and 20B constitute a flow chart illustrating the test candidate side process 300 for a typical embodiment of the invention. Process 300 may be executed by any image capture device 200 illustrated in FIG. 1 including, but not limited to, the devices illustrated in FIGS. 2-19.

In process block 301 the examinee, or test candidate, logs onto the test delivery organization's secure test site and as an additional security feature may turn on a 360° room camera if available from that organization. In process block 302 there is interaction between the test candidate and the remote proctor to validate the test candidate. If it is determined that the candidate is invalid, the exam will stop as in process block 303. In block 304, if the test candidate passes the first validity test, he/she is prompted to turn on the image capture device and download the software validation and calibration program described below in connection with FIGS. 22A and 22B. Process block 305 validates the image capture device's unique ID with the examinee's testing profile. If the unique ID does not match the examinee's testing profile, process block 303 will stop the exam. Process block 306 calibrates the image capture device through the wireless connection. In process block 307 the device establishes the streaming video connection with the integrated device camera through the wireless connection. In process block 308 the test candidate begins taking the exam. In process block 309 the image capture device streams the 360° videos, in real time, to the test delivery organization secure server. In process blocks 310 and 311, if the image capture device detects that a front facing or ocular screen image has been frozen on the same image with no movement for more than a predetermined time (e.g., five minutes), the remote proctor will send a message to the testing candidate via the testing software. If no response is received within, for example, fifteen seconds, the exam will shut down as in process block 303. In process block 312, when the testing candidate finishes the exam he/she will submit the exam and will sign off with the remote proctor. In process block 313, when the exam has been submitted by the test candidate the image capture device will be automatically disabled. In process block 314 the 360° camera is turned off.

Figure 21A:
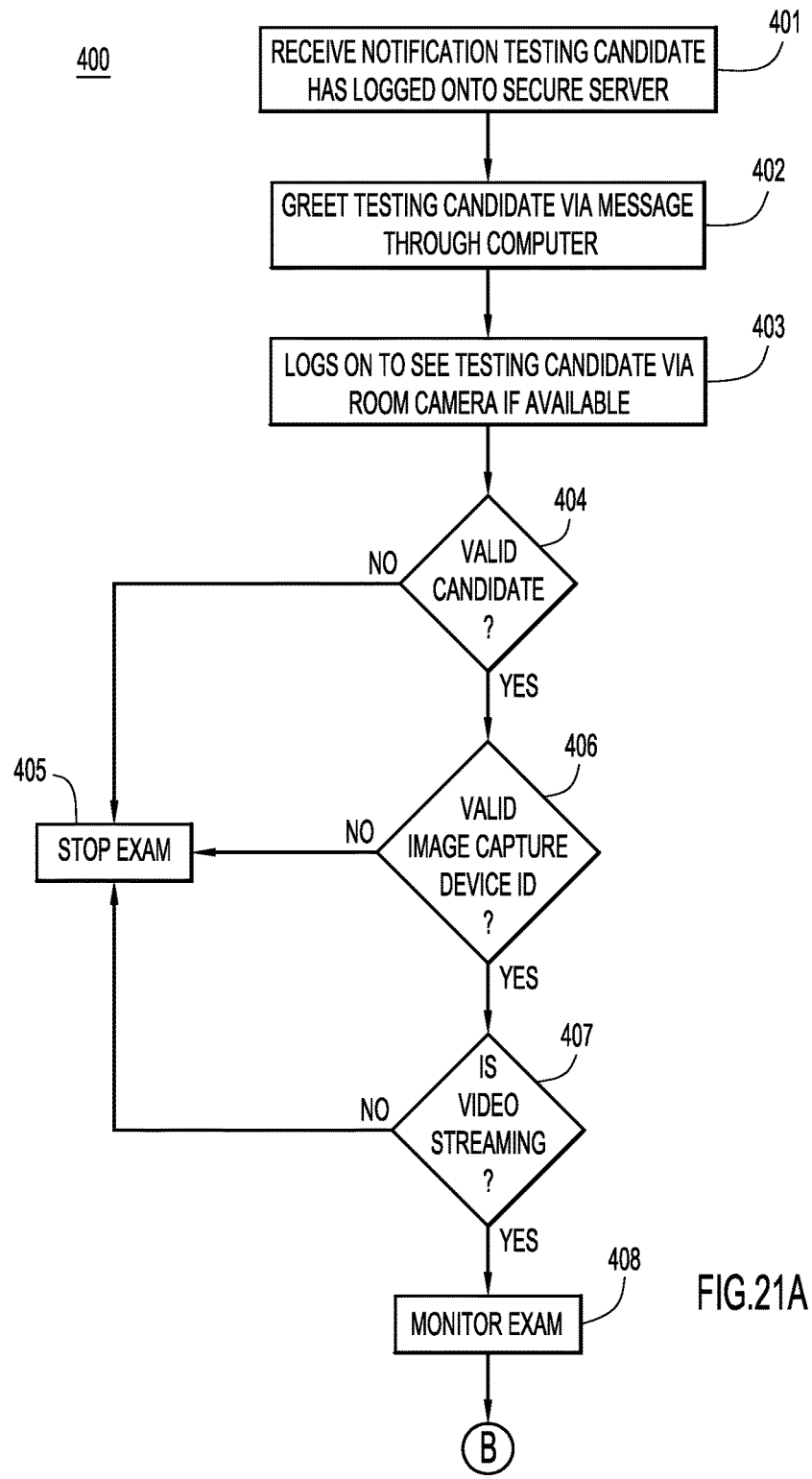
FIGS. 21A and 21B comprise is a flow chart illustrating one embodiment of remote proctor section processing according to the present invention.
Figure 21B:
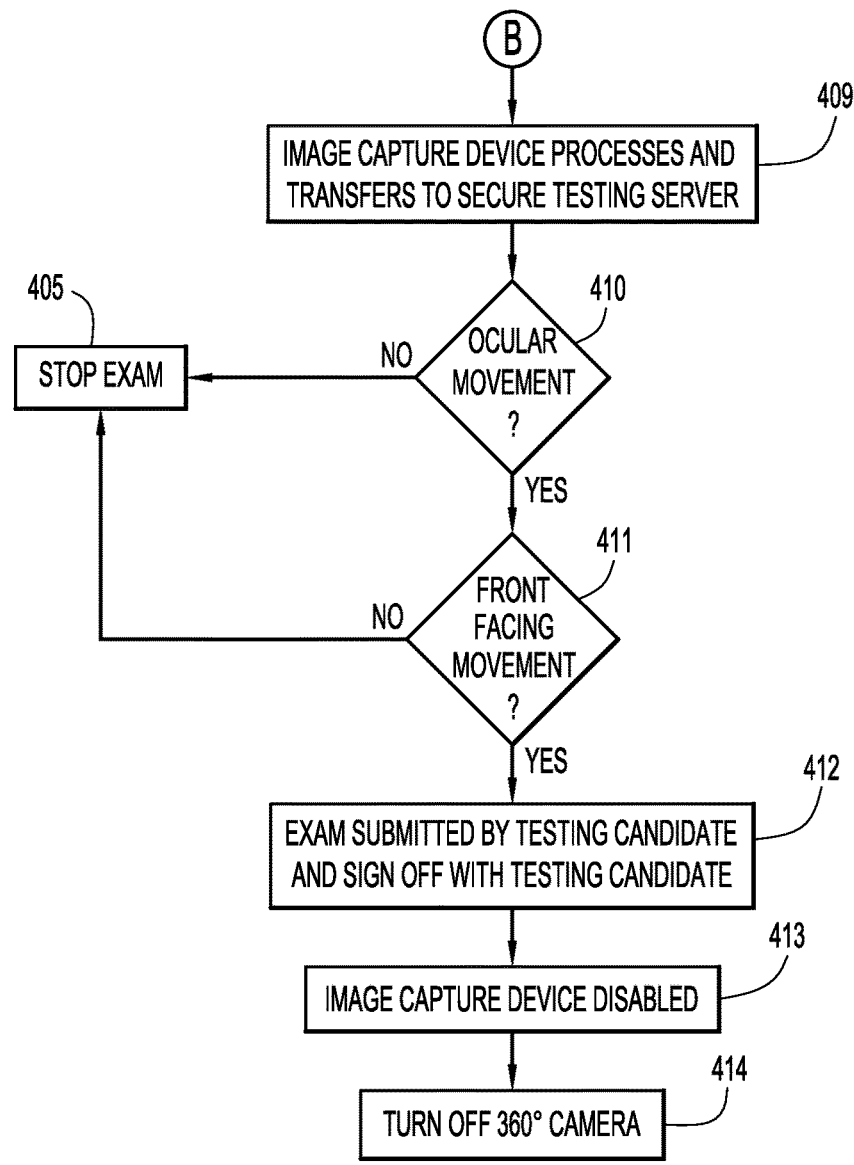

FIGS. 21A and 21B constitute a flow chart illustrating the proctor side progressing 400 for a typical embodiment of the invention. Process 400 may be executed by any image capture device 200 illustrated in FIG. 1 including, but not limited to, the devices illustrated in FIGS. 2-19. In process block 401 the proctor receives notification that a testing candidate has signed onto the secure server. In process block 402 there is communication between the test candidate and the proctor via the test candidate's computer. In the process block 403 the proctor logs on to view the candidate if room cameras are available at the test candidate's location. In process block 404 the proctor checks the validity of the test candidate. If it is determined the candidate is invalid the exam will stop as in process block 405. In process block 406, if the test candidate passes the first validity test, he/she is prompted to turn on the image capture device and download the software validation and calibration program; this process also validates the image capture detector's unique ID with candidate's testing profile. If not valid, process block 405 will stop the exam. In process block 407 the image capture device establishes the streaming video connection with the device camera through the wireless connection for 360° tracking video to the test delivery organization secure server. In process block 408 the system monitors the exam. In process block 409 the image capture device is streaming in real time 360° videos to the test delivery organizations secure server. In process blocks 410 and 411, if the image capture device detects that a front facing or ocular screen image has been frozen on the same image with no movement for more than a predetermined amount of time (e.g., five minutes), the proctor will send a message to the testing candidate. If no response is received the exam will shut down in process block 405. In process block 412, when the testing candidate finishes the exam he/she will submit the exam and will sign off with the proctor. In process block 413, when the exam has been submitted by the test candidate, the image capture devise will be automatically disabled. In process block 414 the test candidate turns off the 360° room cameras, if available, from the test delivery organization.

Figure 22A:
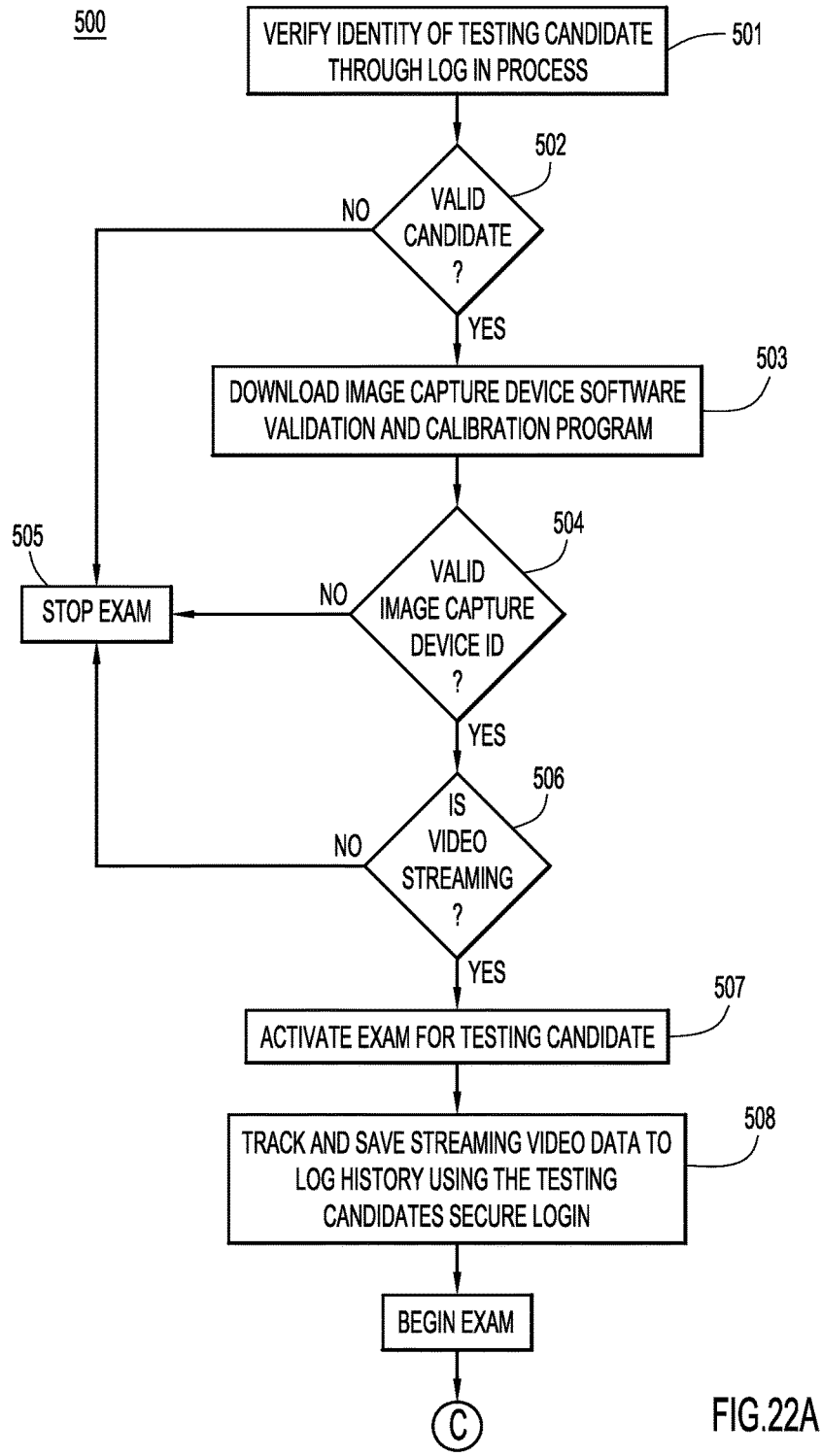
FIGS. 22A and 22B comprise a flow chart illustrating one embodiment of test delivery organization processing according to the present invention.
Figure 22B:
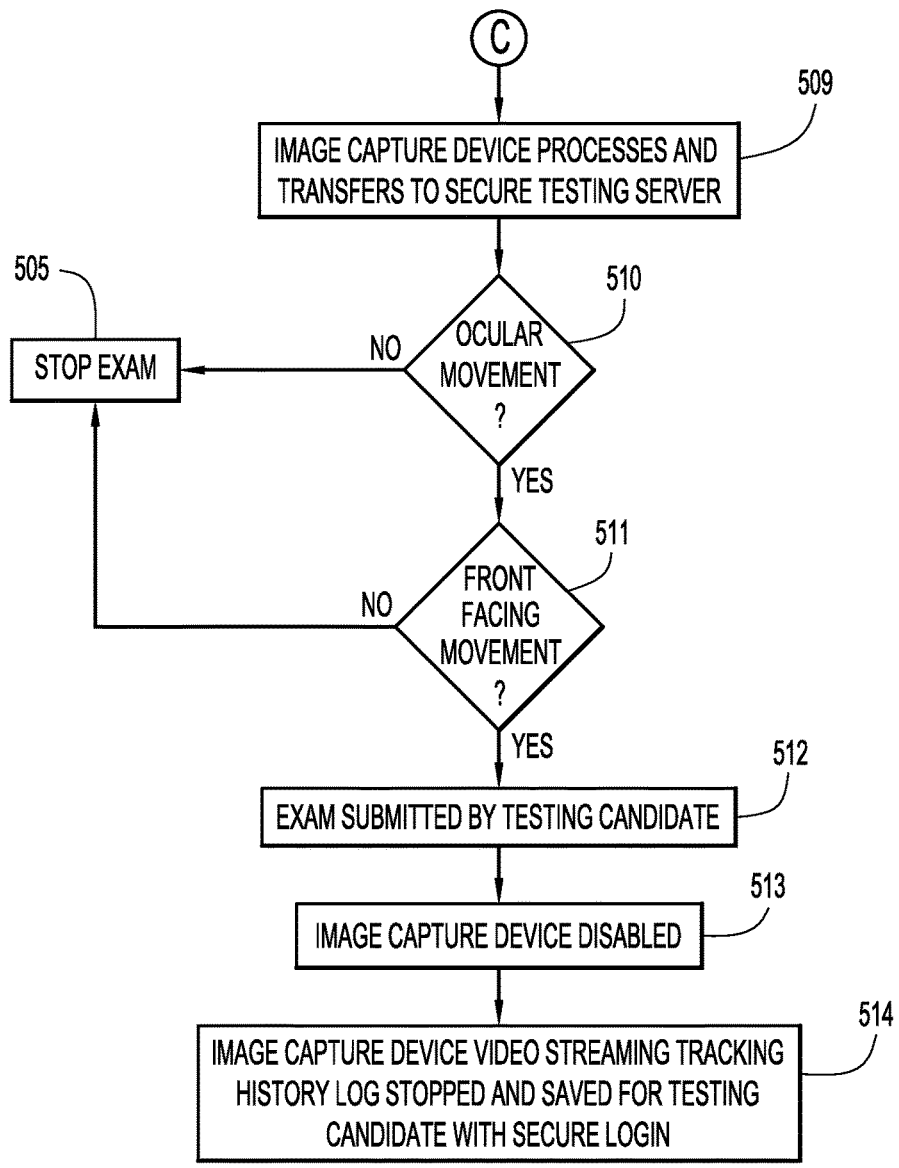

FIG. 22A and constitute a flow chart illustrating the test delivery organization side processing 500 for a typical embodiment of the invention. Process 500 may be executed by any image capture device 200 illustrated in FIG. 1 including, but not limited to, the devices illustrated in FIGS. 2-19. In process block 501 the test delivery organization secure server verifies the identity of the testing candidate through the secure logon procedure. In process block 502 the test delivery organization secure server checks the validity of the test candidate. If it is determined the candidate is invalid, the exam will stop in process block 505. In process block 503 if the test candidate passes the first validity test, he/she is prompted to turn on the image capture device and download the software validation and calibration program; this process also validates the device's unique ID with candidate's testing profile. If the unique ID does not match the candidate's testing profile, process block 505 will stop the exam. In process block 506 the STEW eye gear establishes the streaming video connection with the integrated camera through the wireless connection for 360° tracking video to the test delivery organization secure server. In process block 507 the testing candidate's exam is activated. In process blocks 508 and 509 the image capture device is streaming in real time the 360° tracking videos to the test delivery organization secure server. In process blocks 510 and 511, if the image capture device detects that a front facing or ocular screen image has been frozen on the same image with no movement for more than a predetermined period of time (e.g., five minutes), the proctor will send a message to the testing candidate via the testing software. If no response is received the exam will shut down in process block 505. In process block 512, when the testing candidate finishes the exam he/she will submit the exam and will sign off with the proctor. In process block 513, when the exam has been submitted by the test candidate the image capture device will be automatically disabled. In process block 514 the device video streaming tracking history log is stopped and saved for the testing candidate with their secure login.

Figure 23A:
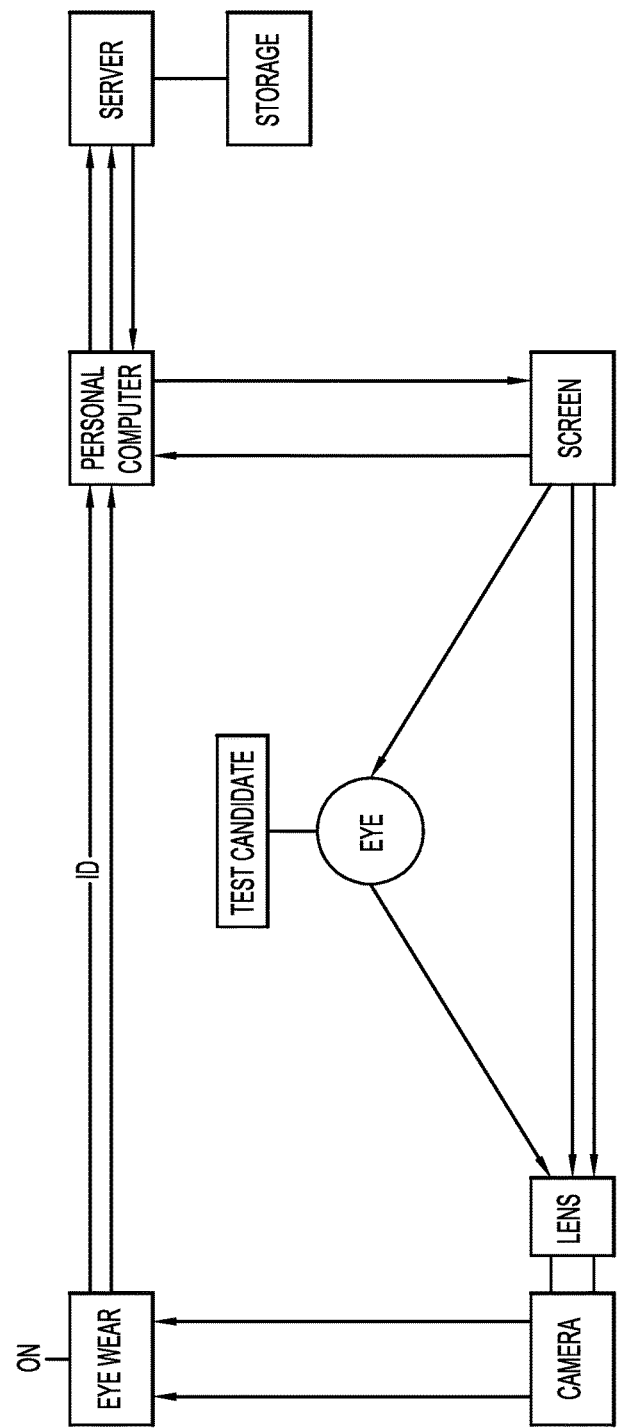
FIGS. 23A and 23B diagrammatically illustrate a calibration cycle flow charts according to the present invention.
Figure 23B:
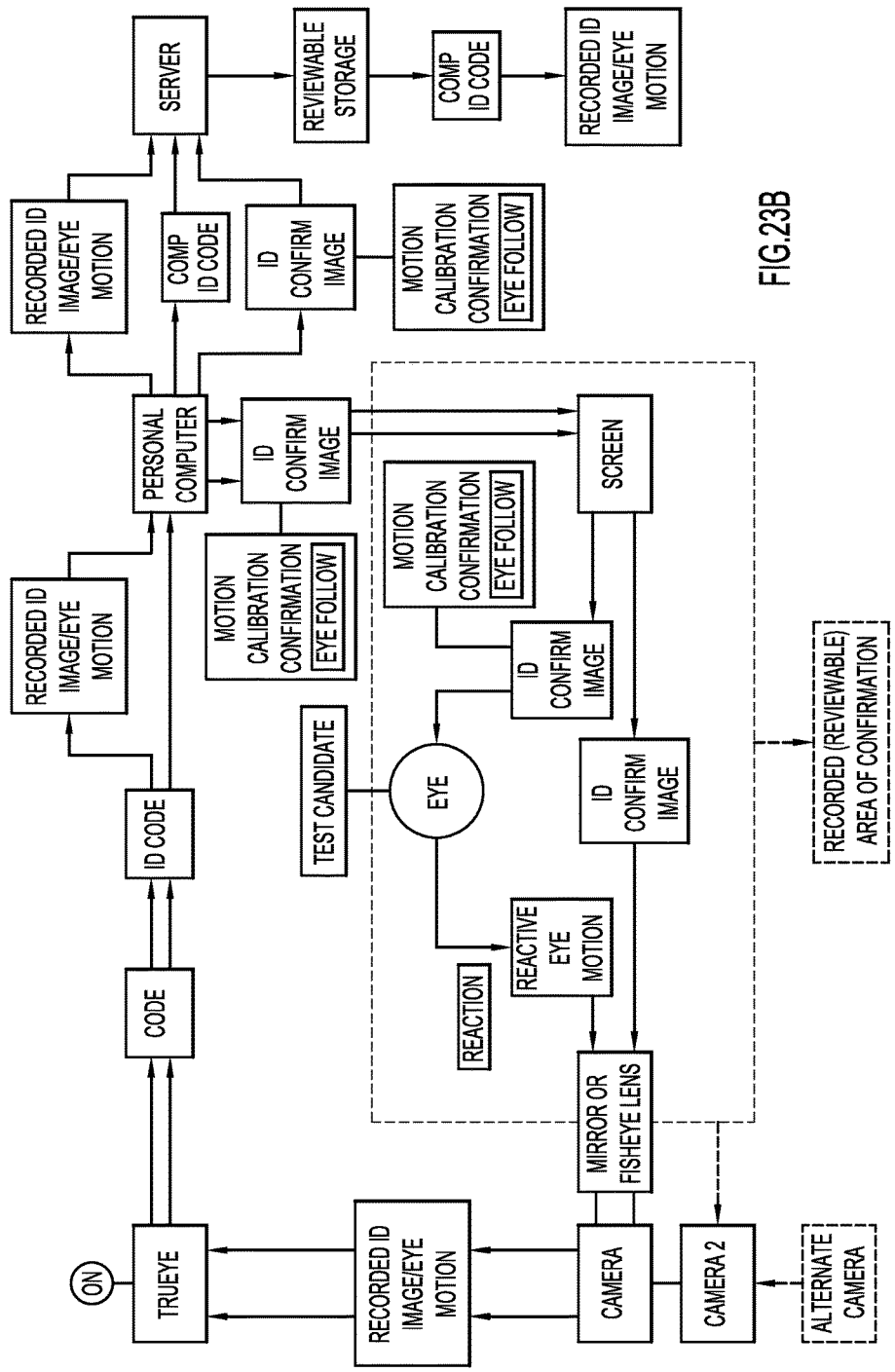

FIGS. 23A and 23B constitute a detailed continuous calibration cycle for the test candidate; his/her eye, personal computer, test sponsor, test delivery organization, the camera(s), and the image capture device. Once the test candidate has turned on his/her computer and image capture device, the device begins to communicate with the central server. The candidate enters his/her unique identification code. The initial communication will include the authentication of the unique testing identification number and the identity of the candidate. After the candidate's identity is authenticated he/she will complete an eye calibration procedure which includes a series of eye movement and image captures for identification and confirmation. The candidate may be asked to look at objects and move his/her head and eyes in various ways, such as up, down, left, right, in order to capture the entire area at the candidate's location. The images will be recorded and sent to the server. This calibration will be continuous to ensure at all times that the candidate is still testing, is the same candidate that began the exam, and that the candidate is not cheating or using unauthorized materials. The dotted lines depict the omnidirectional area that may be recorded all centered on the candidate's eye movements throughout the testing session.

From the foregoing descriptions it will be understood that, in the image capture devices described herein, the camera system comprised of the fish eye camera lens and 360° mirror may be coupled with the device processor which may include a microprocessor, graphic processor and wireless transmitter. The omnidirectional video signals are transmitted from the video camera by the wireless transmitter and then remotely streamed to the secure testing server. The encoded and scaled video stream from the device processor is transmitted to the device transmitter which packages the data for transmission through the wireless transmitter embedded in the device controller. The device transmitter sends the data to the secure testing server 260 in FIG. 1.

The image capture device camera system captures the omnidirectional image as viewed by the examinee wearing that device. Omnidirectional images are sent as a continuous video stream of individual frame images. The image capture device may utilize two cameras or a camera with a fish eye lens and a 360° mirror. The examinee's eye images can be analyzed along with the front facing images. The ocular movements can be correlated to the forward facing images to determine what the user was directly looking at when viewing the front facing images. The camera captures continuous real-time omnidirectional images.

The examinee will be asked by the remote monitor to execute a calibration test (the calibration software must be downloaded after the image capture device is powered on and wireless connection has been made between the device and the examinee's computer where the user is instructed to look in various directions or at various objects. During the calibration the pupil location with each eye image may then be calibrated to the corresponding items captured in the front facing images (e.g. computer monitor, keyboard, and calculator).

The image capture device includes an On/Off switch which is located in the device controller unit. The On/Off switch must be activated to the On mode in order for the image capture device to function. Once the image capture device has been turned on, the testing software provided by the test delivery organization will prompt the examinee to download the image capture device program. This program allows the device to be calibrated; in addition, a security check will be run to validate that the image capture device ID number matches the examinee's test profile. If it doesn't match, the device will be shut down.

The device battery should have a charge life of at least four hours, preferably more. The battery may be rechargeable using a USB port connection to the examinee's computer from the device controller unit. The device battery is located in the device controller and coupled to the electronic components embedded device controller to provide power to the electronic components. For example the battery may be connected to power the video camera, wireless transmitter, the device microprocessor and other components in the device controller. The device controller, microprocessor, battery, control button switches, and transmitter are all encased in the device controller housing and are electrically interconnected to one another and other device electronic components device gear through wiring that run through the device itself.

Although the embodiments described above focus on system operation for an individual examinee for purposes of simplicity and to facilitate understanding, it is to be understood that the system typically functions with multiple examinees communicating with the centrally located server, and that equipment and system functions described herein as associated with one examinee are replicated for each of the other examinees.

The invention may be viewed as a method and system that records a remote test candidate's ocular movement through integrated cameras secured to a head mounted image capture device with the capability of recording and sending the images to a central server that stores the data and sends the images in real time to a proctor if desired. The system is comprised of the head mounted image capture device with an integrated panoramic video camera system that may include a fish eye lens and 360° mirror to capture the examinee's field of view and images of the examinee's eye. A controller integrated with the image capture device includes a battery that can be charged by the examinee's computer and houses a device microprocessor, control switches, and a device transmitter. A processing system located at the central server logs data directly to each candidate's testing event file.

The invention has numerous advantages. For example:

- Proctors have the ability to stop an exam if deemed appropriate according to the test sponsor, and/or test delivery organizations guidelines.
- The recorded data that is streamed to test delivery organizations can also utilize proprietary security methods that track unusual examinee behavior.
- This system may be use as a complement to already established security protocols set up by test delivery organizations, such as 360° web cameras, proprietary software products, hardware devices, and other security products.
- The method and apparatus for tracking a test candidate's eye contact mitigates risk for security breaches.
- The system detects misuse, tampering, and other illicit activity that may be monitored at a centralized test delivery place of business.

Further embodiments and uses for the system may include: tracking an athlete's eye(s) during training; assisting in safety for the elderly or disabled by alerting the person wearing the image capture device to potentially dangerous surrounding objects or impediments such as an up-coming curb; use by professionals working with remote clients when the wearer (i.e., the client) needs assistance by the professional for training; installation, maintenance or repair of equipment; use by marketing professionals for new products or films to track what interests patrons for marketing purposes such as development of a trailer for a movie; use by remote medical personnel to review emergency procedures with colleagues in another location; or for family members of a patient in a hospital or nursing home or other medical setting to use as a viable means of communication.

Having described preferred embodiments of new and improved method and system for providing secure remote testing, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for securely monitoring remotely administered tests of examinees administered in an unsupervised environment via respective remotely located examinee computers, said method comprising:
    (a) for each examinee, with an examinee image capture device mounted on the head of the examinee, capturing images of the examinee's ocular eye movements while contemporaneously capturing images of the examinee's forward field of view during remote administering of said tests;
    (b) with said examinee image capture device, transforming said images of the examinee's ocular eye movements and said images of the examinee's forward field of view to video signals;
    (c) for each examinee, transmitting said video signals from the examinee image capture device to the examinee computer in real time;
    (d) transmitting the video signals from each examinee computer to a central location in real time via a transmission link; and
    (e) at said central location, with a system server, receiving the video signals from said transmission link for each examinee and saving information representing said signals in files dedicated to respective examinees;
    wherein step (a) includes capturing the images of the examinee's ocular eye movements and the images of the examinee's forward field of view with a single camera fixedly secured to said examinee image capture device;
    wherein said single camera is a video camera including a 360 degree mirror; and
    wherein step (a) further includes reflecting images of the examinee's ocular eye movements and images of the examinee's forward field of view with said mirror to said video camera during remote administering of the tests.

2. The method of claim 1, wherein said examinee image capture device is an eyeglasses frame.

3. The method of claim 1, wherein said examinee image capture device is a resiliently flexible elongated clamp-type headset adapted to resiliently engage the examinee's head.

4. The method of claim 3, wherein said single camera assembly is mounted on the end of said clamp-type headset.

5. The method of claim 1, further comprising:
    (f) from said central location, validating the identity of each test examinee and his/her examination responses that are transmitted in step (e).

6. The method of claim 5, further comprising:
(g) from said central location, validating the authenticity of each examinee image capture device with reference to unique identification numbers assigned to respective image capture devices.

7. The method of claim 1, wherein step (e) further comprises:
(e.1) monitoring the received video signals;
(e.2) if either a front facing or ocular image for a particular examinee has been frozen with no movement for more than a predetermined time, sending a message to that examinee; and
(e.3) if no response to that message is received within a set time, shutting down the test and disabling the image capture device for the particular examinee.

8. A system for securely monitoring remotely administered tests of examinees administered in an unsupervised environment via respective remotely located examinee computers, said system comprising:
for each examinee, an examinee image capture device configured to be mounted on the head of the examinee, said image capture device including a device for capturing images of the examinee's ocular eye movements while contemporaneously capturing images of the examinee's forward field of view during remote administering of said tests;
for each examinee, a microprocessor mounted on said examinee image capture device for transforming said images of the examinee's ocular eye movements and said images of the examinee's forward field of view images to video signals;
for each examinee, a transmitter mounted on said examinee image capture device for wirelessly transmitting the video signals to the examinee computer in real time;
a signal transmitter mounted on each examinee image capture device for transmitting the video signals from said each examinee's computer to a central location in real time via a transmission link, and
at said central location, a system server for receiving the video signals from said transmission link for each examinee and saving information representing said signals in files dedicated to respective examinees;
wherein said device for capturing images of the examinee's ocular eye movements and forward field of view includes a single camera fixedly secured to said examinee image capture device; and
wherein said single camera is a video camera, and
wherein said device for capturing images of the examinee's ocular eye movements and forward field of view further includes a 360 degree mirror positioned to reflect the images of the examinee's ocular eye movements and images of the examinee's forward field of view to said video camera.

9. The system of claim 8, wherein said examinee image capture device is an eyeglasses frame.

10. The system of claim 8, wherein said examinee image capture device is a resiliently flexible elongated clamp-type headset adapted to resiliently engage the examinee's head, and said device for capturing images of the examinee's ocular eye movements and forward field of view is fixedly secured to an end of said clamp-type headset.

11. The system of claim 10, wherein said 360 degree mirror is positioned on the end of said clamp-type headset to reflect the images of the examinee's ocular eye movements and the images of the examinee's forward field of view to said video camera.

12. The system of claim 8, further comprising:
software at said central location for validating the authenticity of each image capture device with reference to unique identification numbers assigned to respective image capture devices.

13. The system of claim 8, further comprising:
software at said central location for validating the identity of each test examinee and his/her examination responses.

* * * * *